US008289991B2

(12) United States Patent
Binder

(10) Patent No.: US 8,289,991 B2
(45) Date of Patent: Oct. 16, 2012

(54) NETWORK COMBINING WIRED AND NON-WIRED SEGMENTS

(75) Inventor: Yehuda Binder, Hod Hasharon (IL)

(73) Assignee: Mosaid Technologies Incorporated, Ottawa, Ontario (CA)

( * ) Notice: Subject to any disclaimer, the term of this patent is extended or adjusted under 35 U.S.C. 154(b) by 0 days.

(21) Appl. No.: 12/627,804

(22) Filed: Nov. 30, 2009

(65) Prior Publication Data
US 2010/0135191 A1    Jun. 3, 2010

Related U.S. Application Data

(60) Division of application No. 11/605,336, filed on Nov. 29, 2006, now Pat. No. 7,636,373, which is a continuation of application No. 10/998,015, filed on Nov. 29, 2004, which is a continuation of application No. 10/890,199, filed on Jul. 14, 2004, which is a continuation of application No. 09/552,564, filed on Apr. 19, 2000, now Pat. No. 6,842,459.

(51) Int. Cl.
H04L 12/66 (2006.01)
H04L 5/16 (2006.01)
(52) U.S. Cl. .................................. 370/463; 375/222
(58) Field of Classification Search .......... 370/352–356, 370/419–421, 463, 465–467; 375/220–223
See application file for complete search history.

(56) References Cited

U.S. PATENT DOCUMENTS

| | | | |
|---|---|---|---|
| 2,289,435 A | 10/1942 | Tunick | |
| 2,411,786 A | 11/1946 | Halstead | |
| 3,590,271 A | 6/1971 | Peters | |
| 3,656,112 A | 4/1972 | Paull | |
| 3,699,523 A | 10/1972 | Percher | |
| 3,805,265 A | 4/1974 | Lester | |
| 3,836,888 A | 9/1974 | Boenke et al. | |
| 3,898,566 A | 8/1975 | Switzer et al. | |
| 4,058,678 A | 11/1977 | Dunn et al. | |
| 4,063,220 A | 12/1977 | Metcalfe et al. | |
| 4,199,761 A | 4/1980 | Whyte et al. | |
| 4,200,862 A | 4/1980 | Campbell et al. | |

(Continued)

FOREIGN PATENT DOCUMENTS

EP    0798923    10/1997

(Continued)

OTHER PUBLICATIONS

Cisco Catalyst 5002 Switching System Data sheet; Cisco Systems, 1999, 4 pages.

(Continued)

*Primary Examiner* — Thai Hoang
(74) *Attorney, Agent, or Firm* — Browdy & Neimark, PLLC

(57) ABSTRACT

A network (60) within a residence or other building, including both wired (5) and non-wired segments (53). The wired segments are based on new or existing wires (5a, 5b, 5c, 5d, 5e) in the building, wherein access to the wires is provided by means of outlets (61a, 61d), such as a telephone system, electrical power distribution system, or cable television wiring system. The non-wired segments are based on communication using propagated waves such as radio, sound, or light (e.g. infrared). The wired and non-wired segments interface in the outlet, using a module (50) that serves as mediator between the segments. The module can be integrated into the outlet, partially housed in the outlet, or attached externally to the outlet. Such a network allows for integrated communication of data units (24b) connected by wires and data units (24a, 24d) connected without wires.

32 Claims, 8 Drawing Sheets

U.S. PATENT DOCUMENTS

| | | |
|---|---|---|
| 4,254,305 A | 3/1981 | Treiber |
| 4,303,993 A | 12/1981 | Panepinto, Jr. et al. |
| 4,413,229 A | 11/1983 | Grant |
| 4,456,925 A | 6/1984 | Skerlos et al. |
| 4,462,113 A | 7/1984 | Iwata |
| 4,467,140 A | 8/1984 | Fathauer et al. |
| 4,468,538 A | 8/1984 | Cripps |
| 4,509,211 A | 4/1985 | Robbins |
| 4,551,721 A | 11/1985 | Kozlik |
| 4,706,274 A | 11/1987 | Baker et al. |
| 4,746,809 A | 5/1988 | Coleman et al. |
| 4,761,646 A | 8/1988 | Choquet et al. |
| 4,813,066 A | 3/1989 | Holtz et al. |
| 4,817,204 A | 3/1989 | Jannelli et al. |
| 4,825,349 A | 4/1989 | Marcel |
| 4,850,009 A | 7/1989 | Zook et al. |
| 4,864,588 A | 9/1989 | Simpson et al. |
| 4,866,757 A | 9/1989 | Nilssen |
| 4,885,766 A | 12/1989 | Yasuoka et al. |
| 4,885,803 A | 12/1989 | Hermann et al. |
| 4,901,218 A | 2/1990 | Cornwell |
| 4,918,688 A | 4/1990 | Krause et al. |
| 4,918,690 A | 4/1990 | Markkula, Jr. et al. |
| 4,922,503 A | 5/1990 | Leone |
| 4,975,903 A | 12/1990 | Wakerly et al. |
| 4,980,665 A | 12/1990 | Schotz |
| 4,999,613 A | 3/1991 | Williamson et al. |
| 5,018,138 A | 5/1991 | Twitty et al. |
| 5,033,062 A | 7/1991 | Morrow et al. |
| 5,034,948 A | 7/1991 | Mizutani et al. |
| 5,045,948 A | 9/1991 | Streck et al. |
| 5,063,563 A | 11/1991 | Ikeda et al. |
| 5,068,890 A | 11/1991 | Nilssen |
| 5,095,417 A | 3/1992 | Hagiwara et al. |
| 5,109,222 A | 4/1992 | Welty |
| 5,115,463 A | 5/1992 | Moldavsky et al. |
| 5,136,580 A | 8/1992 | Videlock et al. |
| 5,142,397 A | 8/1992 | Dockery |
| 5,144,544 A | 9/1992 | Jenneve et al. |
| 5,148,144 A | 9/1992 | Sutterlin et al. |
| 5,161,021 A | 11/1992 | Tsai |
| 5,179,586 A | 1/1993 | Lee et al. |
| 5,181,240 A | 1/1993 | Sakuragi et al. |
| 5,187,803 A | 2/1993 | Sohner et al. |
| 5,210,788 A | 5/1993 | Nilssen |
| 5,230,086 A | 7/1993 | Saul |
| 5,247,347 A | 9/1993 | Litteral et al. |
| 5,255,268 A | 10/1993 | Cato et al. |
| 5,265,150 A | 11/1993 | Helmkamp et al. |
| 5,274,631 A | 12/1993 | Bhardwaj |
| 5,276,918 A | 1/1994 | Cornforth et al. |
| 5,289,461 A | 2/1994 | De Nijs |
| 5,297,141 A | 3/1994 | Marum |
| 5,297,203 A | 3/1994 | Rose et al. |
| 5,311,114 A | 5/1994 | Sambamurthy et al. |
| 5,311,518 A | 5/1994 | Takato et al. |
| 5,321,736 A | 6/1994 | Beasley |
| 5,321,846 A | 6/1994 | Yokota et al. |
| 5,343,240 A | 8/1994 | Yu |
| 5,347,549 A | 9/1994 | Baumann et al. |
| 5,377,255 A | 12/1994 | Beasley |
| 5,381,459 A | 1/1995 | Lappington |
| 5,390,235 A | 2/1995 | Beasley |
| 5,391,932 A | 2/1995 | Small et al. |
| 5,404,570 A | 4/1995 | Charas et al. |
| 5,406,249 A | 4/1995 | Pettus |
| 5,406,260 A | 4/1995 | Cummings et al. |
| 5,414,708 A | 5/1995 | Webber et al. |
| 5,420,572 A | 5/1995 | Dolin, Jr. et al. |
| 5,421,030 A | 5/1995 | Baran |
| 5,424,710 A | 6/1995 | Baumann |
| 5,432,838 A | 7/1995 | Purchase et al. |
| 5,440,335 A | 8/1995 | Beveridge |
| 5,454,008 A | 9/1995 | Baumann et al. |
| 5,467,384 A | 11/1995 | Skinner, Sr. et al. |
| 5,475,687 A | 12/1995 | Markkula, Jr. et al. |
| 5,479,400 A | 12/1995 | Dilworth et al. |
| 5,481,249 A | 1/1996 | Sato |
| 5,487,066 A | 1/1996 | McNamara et al. |
| 5,489,894 A | 2/1996 | Murray |
| 5,499,241 A | 3/1996 | Thompson et al. |
| 5,528,507 A | 6/1996 | McNamara et al. |
| 5,535,336 A | 7/1996 | Smith et al. |
| 5,537,637 A | 7/1996 | Sugita et al. |
| 5,539,821 A | 7/1996 | Blonder |
| 5,544,164 A | 8/1996 | Baran |
| 5,546,385 A | 8/1996 | Caspi et al. |
| 5,565,855 A | 10/1996 | Knibbe |
| 5,572,575 A | 11/1996 | Yamamoto et al. |
| 5,574,964 A | 11/1996 | Hamlin |
| 5,579,221 A | 11/1996 | Mun |
| 5,590,173 A | 12/1996 | Beasley |
| 5,594,726 A | 1/1997 | Thompson et al. |
| 5,594,732 A | 1/1997 | Bell et al. |
| 5,600,333 A | 2/1997 | Justice et al. |
| 5,603,080 A | 2/1997 | Kallander et al. |
| 5,613,190 A | 3/1997 | Hylton |
| 5,619,251 A | 4/1997 | Kuroiwa et al. |
| 5,619,505 A | 4/1997 | Grube et al. |
| 5,627,501 A | 5/1997 | Biran et al. |
| 5,628,055 A | 5/1997 | Stein |
| 5,634,191 A | 5/1997 | Beasley |
| 5,652,893 A | 7/1997 | Ben-Meir et al. |
| 5,657,358 A | 8/1997 | Panech et al. |
| 5,666,402 A | 9/1997 | Griffin |
| 5,671,220 A | 9/1997 | Tonomura |
| 5,696,861 A | 12/1997 | Schimmeyer et al. |
| 5,708,705 A | 1/1998 | Yamashita et al. |
| 5,708,961 A | 1/1998 | Hylton et al. |
| 5,731,664 A | 3/1998 | Posa |
| 5,734,678 A | 3/1998 | Paneth et al. |
| 5,736,965 A | 4/1998 | Mosebrook et al. |
| 5,748,104 A | 5/1998 | Argyroudis et al. |
| 5,748,634 A | 5/1998 | Sokol et al. |
| 5,754,539 A | 5/1998 | Metz et al. |
| 5,774,789 A | 6/1998 | van der Kaay et al. |
| 5,777,769 A | 7/1998 | Coutinho |
| 5,796,739 A | 8/1998 | Kim |
| 5,802,173 A | 9/1998 | Hamilton-Piercy et al. |
| 5,802,177 A | 9/1998 | Daniel et al. |
| 5,805,806 A | 9/1998 | McArthur |
| 5,809,431 A | 9/1998 | Bustamante et al. |
| 5,812,184 A | 9/1998 | Martinez |
| 5,812,531 A | 9/1998 | Cheung et al. |
| 5,815,086 A | 9/1998 | Ivie et al. |
| 5,815,681 A | 9/1998 | Kikinis |
| 5,818,725 A | 10/1998 | McNamara et al. |
| 5,822,677 A | 10/1998 | Peyrovian |
| 5,822,678 A | 10/1998 | Evanyk |
| 5,828,663 A | 10/1998 | Ikegami |
| 5,832,364 A | 11/1998 | Gustafson |
| 5,832,365 A | 11/1998 | Chen et al. |
| 5,835,863 A | 11/1998 | Ikenouchi et al. |
| 5,838,226 A | 11/1998 | Houggy et al. |
| 5,845,190 A | 12/1998 | Bushue et al. |
| 5,864,284 A | 1/1999 | Sanderson |
| 5,886,732 A | 3/1999 | Humpleman |
| 5,896,556 A | 4/1999 | Moreland et al. |
| 5,896,569 A | 4/1999 | Butler et al. |
| 5,905,442 A | 5/1999 | Mosebrook et al. |
| 5,909,445 A | 6/1999 | Schneider |
| 5,910,776 A | 6/1999 | Black |
| 5,917,624 A | 6/1999 | Wagner |
| 5,918,016 A | 6/1999 | Brewer et al. |
| 5,926,531 A | 7/1999 | Petite |
| 5,930,682 A | 7/1999 | Schwartz et al. |
| 5,930,719 A | 7/1999 | Babitch et al. |
| 5,936,660 A | 8/1999 | Gurantz |
| 5,937,342 A | 8/1999 | Kline |
| 5,937,348 A | 8/1999 | Cina et al. |
| 5,940,400 A | 8/1999 | Eastmond et al. |
| 5,946,616 A | 8/1999 | Schornack et al. |
| 5,950,149 A | 9/1999 | Fieramosca et al. |
| 5,953,670 A | 9/1999 | Newson |
| 5,960,344 A | 9/1999 | Mahany |
| 5,963,844 A | 10/1999 | Dail |
| 5,977,913 A | 11/1999 | Christ |

| Patent | Date | Name |
|---|---|---|
| 5,982,363 A | 11/1999 | Naiff |
| 5,982,854 A | 11/1999 | Ehreth |
| 5,983,070 A | 11/1999 | Georges et al. |
| 5,983,117 A | 11/1999 | Sandler et al. |
| 5,986,574 A | 11/1999 | Colton |
| 5,987,303 A | 11/1999 | Dutta et al. |
| 5,991,831 A | 11/1999 | Lee et al. |
| 5,991,885 A | 11/1999 | Chang et al. |
| 5,994,998 A | 11/1999 | Fisher et al. |
| 5,995,593 A | 11/1999 | Cho |
| 5,999,612 A | 12/1999 | Dunn et al. |
| 6,005,884 A | 12/1999 | Cook et al. |
| 6,009,465 A | 12/1999 | Decker et al. |
| 6,009,479 A | 12/1999 | Jeffries |
| 6,021,158 A | 2/2000 | Schurr et al. |
| 6,025,945 A | 2/2000 | Nyu et al. |
| 6,026,150 A | 2/2000 | Frank et al. |
| 6,032,057 A | 2/2000 | Kiiski |
| 6,040,759 A | 3/2000 | Sanderson |
| 6,061,357 A | 5/2000 | Olshansky et al. |
| 6,064,673 A | 5/2000 | Anderson et al. |
| 6,069,588 A | 5/2000 | O'Neill |
| 6,069,899 A | 5/2000 | Foley |
| 6,081,519 A | 6/2000 | Petler |
| 6,081,533 A | 6/2000 | Laubach et al. |
| 6,101,341 A | 8/2000 | Manabe |
| 6,108,331 A | 8/2000 | Thompson |
| 6,115,755 A | 9/2000 | Krishan |
| 6,130,896 A | 10/2000 | Lueker et al. |
| 6,141,356 A | 10/2000 | Gorman |
| 6,151,480 A | 11/2000 | Fischer et al. |
| 6,157,645 A | 12/2000 | Shobatake |
| 6,167,120 A | 12/2000 | Kikinis |
| 6,175,522 B1 | 1/2001 | Fang |
| 6,175,860 B1 | 1/2001 | Gaucher |
| 6,178,455 B1 | 1/2001 | Schutte et al. |
| 6,205,495 B1 | 3/2001 | Gilbert et al. |
| 6,218,931 B1 | 4/2001 | Asghar et al. |
| 6,219,409 B1 | 4/2001 | Smith et al. |
| 6,233,235 B1 | 5/2001 | Burke et al. |
| 6,243,394 B1 | 6/2001 | Deng |
| 6,243,413 B1 | 6/2001 | Beukema |
| 6,243,571 B1 | 6/2001 | Bullock et al. |
| 6,249,671 B1 | 6/2001 | Tucker et al. |
| 6,256,296 B1 | 7/2001 | Ruziak et al. |
| 6,259,910 B1 | 7/2001 | Fairfield et al. |
| 6,317,884 B1 | 11/2001 | Eames et al. |
| 6,330,244 B1 | 12/2001 | Swartz et al. |
| 6,346,875 B1 | 2/2002 | Puckette et al. |
| 6,353,599 B1 | 3/2002 | Bi et al. |
| 6,383,076 B1 | 5/2002 | Tiedeken ............... 463/40 |
| 6,392,349 B1 | 5/2002 | Crenshaw |
| 6,396,391 B1 | 5/2002 | Binder |
| 6,400,815 B1 | 6/2002 | Gilboy et al. |
| 6,400,957 B1 | 6/2002 | Rodrigues et al. |
| 6,418,558 B1 | 7/2002 | Roberts et al. |
| 6,438,109 B1 | 8/2002 | Karaoguz et al. |
| 6,452,910 B1 | 9/2002 | Vij et al. |
| 6,452,923 B1 | 9/2002 | Gerszberg et al. |
| 6,481,013 B1 | 11/2002 | Dinwiddie et al. |
| 6,483,470 B1 | 11/2002 | Hohnstein et al. |
| 6,483,902 B1 | 11/2002 | Stewart et al. |
| 6,492,897 B1 | 12/2002 | Mowery, Jr. |
| 6,493,875 B1 | 12/2002 | Eames et al. |
| 6,501,942 B1 | 12/2002 | Weissman et al. |
| 6,513,163 B1 | 1/2003 | Silvia et al. |
| 6,526,581 B1 | 2/2003 | Edson |
| 6,535,110 B1 | 3/2003 | Arora et al. |
| 6,542,464 B1 | 4/2003 | Takada et al. |
| 6,546,098 B1 | 4/2003 | Henderson |
| 6,549,616 B1 | 4/2003 | Binder |
| 6,563,418 B1 | 5/2003 | Moon |
| 6,573,826 B2 | 6/2003 | Pan |
| 6,577,231 B2 | 6/2003 | Litwin, Jr. et al. |
| 6,580,728 B1 | 6/2003 | Cook et al. |
| 6,583,719 B2 | 6/2003 | Okada et al. |
| 6,587,479 B1 | 7/2003 | Bianchi et al. |
| 6,587,739 B1 | 7/2003 | Abrams et al. |
| 6,600,734 B1 | 7/2003 | Gernert et al. |
| 6,618,578 B1 | 9/2003 | Petite |
| 6,622,304 B1 | 9/2003 | Carhart |
| 6,650,871 B1 | 11/2003 | Cannon et al. |
| 6,653,932 B1 | 11/2003 | Beamish et al. |
| 6,654,616 B1 | 11/2003 | Pope, Jr. et al. |
| 6,659,947 B1 | 12/2003 | Carter et al. |
| 6,668,328 B1 | 12/2003 | Bell |
| 6,671,519 B2 | 12/2003 | Jeon et al. |
| 6,678,740 B1 | 1/2004 | Rakib et al. |
| 6,683,531 B2 | 1/2004 | Diamanti et al. |
| 6,690,677 B1 | 2/2004 | Binder |
| 6,704,545 B1 | 3/2004 | Wala |
| 6,710,721 B1 | 3/2004 | Holowick |
| 6,711,417 B1 | 3/2004 | Gorman et al. |
| 6,714,534 B1 | 3/2004 | Gerszberg et al. |
| 6,725,059 B1 | 4/2004 | Bell |
| 6,731,945 B2 | 5/2004 | Do et al. |
| 6,737,984 B1 | 5/2004 | Welles, II et al. |
| 6,738,641 B1 | 5/2004 | Elsasser |
| 6,748,080 B2 | 6/2004 | Russ et al. |
| 6,751,441 B1 | 6/2004 | Murray et al. |
| 6,759,946 B2 | 7/2004 | Sahinoglu et al. |
| 6,760,384 B1 | 7/2004 | Garreau et al. |
| 6,771,164 B1 | 8/2004 | Fink |
| 6,772,331 B1 | 8/2004 | Hind et al. |
| 6,781,530 B2 | 8/2004 | Moore |
| 6,782,048 B2 | 8/2004 | Santhoff |
| 6,796,555 B1 | 9/2004 | Blahut |
| 6,804,195 B2 | 10/2004 | Izumi et al. |
| 6,807,463 B1 | 10/2004 | Cunningham et al. |
| 6,826,174 B1 | 11/2004 | Erekson et al. |
| 6,831,921 B2 | 12/2004 | Higgins |
| 6,844,809 B2 | 1/2005 | Manis et al. |
| 6,850,560 B1 | 2/2005 | Heusala |
| 6,857,132 B1 | 2/2005 | Rakib et al. |
| 6,885,674 B2 | 4/2005 | Hunt et al. |
| 6,901,439 B1 | 5/2005 | Bonasia et al. |
| 6,912,651 B1 | 6/2005 | Hamdi et al. |
| 6,930,987 B1 | 8/2005 | Fukuda et al. |
| 6,931,659 B1 | 8/2005 | Kinemura |
| 6,933,835 B2 | 8/2005 | Kline |
| 6,941,576 B2 | 9/2005 | Amit |
| 6,947,736 B2 | 9/2005 | Shaver et al. |
| 6,950,567 B2 | 9/2005 | Kline |
| 6,956,826 B1 | 10/2005 | Binder |
| 6,961,763 B1 | 11/2005 | Wang et al. |
| 6,963,936 B2 | 11/2005 | Billington et al. |
| 6,965,302 B2 | 11/2005 | Mollenkopf et al. |
| 6,980,089 B1 | 12/2005 | Kline |
| 6,985,072 B2 | 1/2006 | Omidi et al. |
| 6,985,714 B2 | 1/2006 | Akiyama et al. |
| 6,993,317 B2 | 1/2006 | Belsak, Jr. |
| 6,995,657 B2 | 2/2006 | Zalitzky et al. |
| 6,996,837 B1 | 2/2006 | Miura et al. |
| 6,998,964 B2 | 2/2006 | Lomax, Jr. et al. |
| 7,003,102 B2 | 2/2006 | Kiko |
| 7,006,006 B2 | 2/2006 | Witkow et al. |
| 7,009,527 B2 | 3/2006 | Seo |
| 7,009,946 B1 | 3/2006 | Kardach |
| 7,015,797 B2 | 3/2006 | Kaylor et al. |
| 7,027,416 B1 | 4/2006 | Kriz |
| 7,027,483 B2 | 4/2006 | Santhoff et al. |
| 7,027,770 B2 | 4/2006 | Judd et al. |
| 7,035,270 B2 | 4/2006 | Moore, Jr. et al. |
| 7,035,280 B2 | 4/2006 | Binder |
| 7,035,281 B1 | 4/2006 | Spearman et al. |
| 7,064,654 B2 | 6/2006 | Berkman et al. |
| 7,082,320 B2 | 7/2006 | Kattukaran et al. |
| 7,088,238 B2 | 8/2006 | Karaoguz et al. |
| 7,099,368 B2 | 8/2006 | Santhoff et al. |
| 7,099,621 B1 | 8/2006 | Chadwick |
| 7,103,240 B2 | 9/2006 | Kline |
| 7,106,261 B2 | 9/2006 | Nagel et al. |
| 7,106,721 B1 | 9/2006 | Binder |
| 7,113,134 B1 | 9/2006 | Berkman |
| 7,113,763 B2 | 9/2006 | Heinonen et al. |
| 7,117,520 B2 | 10/2006 | Stewart |
| 7,133,729 B1 | 11/2006 | Wang et al. |
| 7,142,560 B2 | 11/2006 | Mansfield |

| | | |
|---|---|---|
| 7,143,299 B1 | 11/2006 | Rubinstein et al. |
| 7,149,474 B1 | 12/2006 | Mikhak |
| 7,151,575 B1 | 12/2006 | Landry et al. |
| 7,155,214 B2 | 12/2006 | Struthers et al. |
| 7,158,483 B1 | 1/2007 | Takabatake et al. |
| 7,162,377 B2 | 1/2007 | Amrod et al. |
| 7,164,886 B2 | 1/2007 | Mowery et al. |
| 7,167,078 B2 | 1/2007 | Pourchot |
| 7,167,525 B2 | 1/2007 | Santhoff et al. |
| 7,167,923 B2 | 1/2007 | Lo |
| 7,181,023 B1 | 2/2007 | Andrews et al. |
| 7,187,695 B2 | 3/2007 | Binder |
| 7,187,946 B2 | 3/2007 | Palan |
| 7,194,251 B2 | 3/2007 | Rubinstein et al. |
| 7,209,945 B2 | 4/2007 | Hicks, III et al. |
| 7,257,106 B2 | 8/2007 | Chen et al. |
| 7,257,108 B2 | 8/2007 | Cheston et al. |
| 7,266,344 B2 | 9/2007 | Rodriguez |
| 7,275,255 B2 | 9/2007 | Suda et al. |
| 7,292,859 B2 | 11/2007 | Park |
| 7,299,287 B1 | 11/2007 | Rubinstein et al. |
| 7,310,355 B1 | 12/2007 | Krein et al. |
| 7,319,717 B2 | 1/2008 | Zitting |
| 7,322,860 B2 | 1/2008 | Martich et al. |
| 7,324,488 B1 | 1/2008 | Rubinstein et al. |
| 7,324,824 B2 | 1/2008 | Smith et al. |
| 7,330,695 B2 | 2/2008 | Karschnia et al. |
| 7,331,819 B2 | 2/2008 | Nelson et al. |
| 7,345,998 B2 | 3/2008 | Cregg et al. |
| 7,346,918 B2 | 3/2008 | Hennenhoefer et al. |
| 7,359,392 B2 | 4/2008 | Bianchi et al. |
| 7,362,285 B2 | 4/2008 | Webb et al. |
| 7,375,445 B1 | 5/2008 | Smith |
| 7,382,786 B2 | 6/2008 | Chen et al. |
| 7,382,876 B2 | 6/2008 | Lauter et al. |
| 7,483,524 B2 | 1/2009 | Binder |
| 7,486,648 B1 | 2/2009 | Baranowski ............ 370/338 |
| 7,633,966 B2 | 12/2009 | Binder |
| 7,636,373 B2 | 12/2009 | Binder |
| 7,653,033 B2 | 1/2010 | Beach et al. |
| 2001/0039660 A1 | 11/2001 | Vasilevsky et al. |
| 2002/0011923 A1 | 1/2002 | Cunningham et al. |
| 2002/0021465 A1 | 2/2002 | Moore et al. |
| 2002/0022467 A1 | 2/2002 | Matsui |
| 2002/0031114 A1 | 3/2002 | Terry et al. |
| 2002/0034220 A1 | 3/2002 | Duxbury |
| 2002/0035624 A1 | 3/2002 | Kim |
| 2002/0037004 A1 | 3/2002 | Bossemeyer et al. |
| 2002/0038459 A1 | 3/2002 | Talmola et al. |
| 2002/0049036 A1 | 4/2002 | Bullock et al. |
| 2002/0059634 A1 | 5/2002 | Terry et al. |
| 2002/0069417 A1 | 6/2002 | Kliger et al. |
| 2002/0075806 A1 | 6/2002 | Shalvi et al. |
| 2002/0095662 A1 | 7/2002 | Ashlock et al. |
| 2002/0097821 A1 | 7/2002 | Hebron et al. |
| 2002/0116720 A1 | 8/2002 | Terry et al. |
| 2002/0128009 A1 | 9/2002 | Boch et al. |
| 2002/0150155 A1 | 10/2002 | Florentin et al. |
| 2002/0166124 A1 | 11/2002 | Gurantz et al. |
| 2002/0174423 A1 | 11/2002 | Fifield et al. |
| 2002/0194383 A1 | 12/2002 | Cohen et al. |
| 2002/0194605 A1 | 12/2002 | Cohen et al. |
| 2003/0006881 A1 | 1/2003 | Reyes |
| 2003/0018975 A1 | 1/2003 | Stone |
| 2003/0066082 A1 | 4/2003 | Kliger et al. |
| 2003/0067910 A1 | 4/2003 | Razazian et al. |
| 2003/0099228 A1 | 5/2003 | Alcock |
| 2003/0100288 A1 | 5/2003 | Tomlinson, Jr. et al. |
| 2003/0100330 A1 | 5/2003 | Tomlinson, Jr. et al. |
| 2003/0106067 A1 | 6/2003 | Hoskins et al. |
| 2004/0032373 A1 | 2/2004 | Petros et al. |
| 2004/0073597 A1 | 4/2004 | Caveney et al. |
| 2004/0077310 A1 | 4/2004 | Levy |
| 2004/0083262 A1 | 4/2004 | Trantow |
| 2004/0085976 A1 | 5/2004 | Dale et al. |
| 2004/0107299 A1 | 6/2004 | Lee et al. |
| 2004/0107445 A1 | 6/2004 | Amit |
| 2004/0123322 A1 | 6/2004 | Erkocevic et al. |
| 2004/0125870 A1 | 7/2004 | Yamazaki |
| 2004/0136388 A1 | 7/2004 | Schaff |
| 2004/0158649 A1 | 8/2004 | Ophir et al. |
| 2004/0187156 A1 | 9/2004 | Palm et al. |
| 2004/0203387 A1 | 10/2004 | Grannan |
| 2004/0208167 A1 | 10/2004 | Kishida |
| 2004/0208599 A1 | 10/2004 | Swartz et al. |
| 2004/0235468 A1 | 11/2004 | Luebke et al. |
| 2004/0250273 A1 | 12/2004 | Swix et al. |
| 2004/0255332 A1 | 12/2004 | Bertonis et al. |
| 2005/0034159 A1 | 2/2005 | Ophir et al. |
| 2005/0038875 A1 | 2/2005 | Park |
| 2005/0073968 A1 | 4/2005 | Perlman |
| 2005/0084004 A1 | 4/2005 | Bione |
| 2005/0086694 A1 | 4/2005 | Hicks et al. |
| 2005/0089061 A1 | 4/2005 | Logvinov et al. |
| 2005/0114325 A1 | 5/2005 | Liu et al. |
| 2005/0136972 A1 | 6/2005 | Smith et al. |
| 2005/0144647 A1 | 6/2005 | Zussman et al. |
| 2005/0152337 A1 | 7/2005 | Wurtzel et al. |
| 2005/0164666 A1 | 7/2005 | Lang et al. |
| 2005/0181839 A1 | 8/2005 | Tiainen et al. |
| 2005/0226200 A1 | 10/2005 | Askildsen et al. |
| 2005/0226206 A1 | 10/2005 | An |
| 2005/0239400 A1 | 10/2005 | Narikawa |
| 2005/0268322 A1 | 12/2005 | Watson |
| 2006/0007945 A1 | 1/2006 | Schoettle et al. |
| 2006/0018328 A1 | 1/2006 | Mody et al. |
| 2006/0056444 A1 | 3/2006 | Binder |
| 2006/0133465 A1 | 6/2006 | Dockemeyer, Jr. et al. |
| 2006/0152344 A1 | 7/2006 | Mowery, Jr. |
| 2006/0172781 A1 | 8/2006 | Mohebbi |
| 2006/0210278 A1 | 9/2006 | Cregg et al. |
| 2006/0215680 A1 | 9/2006 | Camagna |
| 2006/0220833 A1 | 10/2006 | Berkman |
| 2006/0222086 A1 | 10/2006 | Frye, Jr. |
| 2006/0235333 A1 | 10/2006 | Couvillon, Jr. |
| 2006/0238250 A1 | 10/2006 | Camagna et al. |
| 2006/0251086 A1 | 11/2006 | Ha et al. |
| 2006/0251179 A1 | 11/2006 | Ghoshal |
| 2006/0274745 A1 | 12/2006 | Wang et al. |
| 2006/0280197 A1 | 12/2006 | Stone |
| 2006/0286958 A1 | 12/2006 | Lee et al. |
| 2007/0002772 A1 | 1/2007 | Berkman et al. |
| 2007/0002876 A1 | 1/2007 | Berkman et al. |
| 2007/0019959 A1 | 1/2007 | Retnasothie et al. |
| 2007/0025368 A1 | 2/2007 | Ha et al. |
| 2007/0047573 A1 | 3/2007 | Logvinov et al. |
| 2007/0054622 A1 | 3/2007 | Berkman |
| 2007/0058666 A1 | 3/2007 | Pratt |
| 2007/0082649 A1 | 4/2007 | Chan |
| 2007/0083668 A1 | 4/2007 | Kelsey et al. |
| 2007/0104168 A1 | 5/2007 | Polson |
| 2007/0112939 A1 | 5/2007 | Wilson et al. |
| 2007/0139188 A1 | 6/2007 | Ollis et al. |
| 2007/0167144 A1 | 7/2007 | Koga et al. |
| 2007/0177495 A1 | 8/2007 | Ametsitsi |
| 2007/0198748 A1 | 8/2007 | Ametsitsi et al. |
| 2007/0206629 A1 | 9/2007 | Choi |
| 2007/0254714 A1 | 11/2007 | Martich et al. |
| 2007/0268886 A1 | 11/2007 | Caspi et al. |
| 2008/0025723 A1 | 1/2008 | Mayer et al. |
| 2008/0062013 A1 | 3/2008 | Face et al. |

FOREIGN PATENT DOCUMENTS

| | | |
|---|---|---|
| JP | 59215137 | 12/1984 |
| JP | 60139095 A | 7/1985 |
| JP | 11098113 A | 4/1999 |
| JP | 11136392 | 5/1999 |
| JP | 2001217757 A | 8/2001 |
| KR | 199822718 | 7/1998 |
| KR | 1020000000152 A | 1/2000 |
| WO | 9623377 A1 | 8/1996 |
| WO | 9854901 A1 | 12/1998 |
| WO | 9925098 | 5/1999 |
| WO | 2004068827 A1 | 8/2004 |
| WO | 2005022692 A2 | 3/2005 |

OTHER PUBLICATIONS

Cisco Catalyst 5000 Series; Cisco Systems, 1996, pp. 589-600.

Cisco Catalyst 5000 Group Switching Ethernet Modules Data Sheet; Cisco Systems, 1996, 9 pages.
Powerhouse Wireless Remote Controls: Apr. 5, 2008 (3 pages).
Powerhouse Wireless Wall Switches: Apr. 5, 2008 (3 pages).
JVC VIPSLAN-10 Infrared Wireless LAN system; May 1996 (10 pages).
JVC Introducing VIPSLAN-10; Jan. 18, 2007 (2 pages).
JVC Satellite; Jan. 18, 2007 (2 pages).
JVC Node; Jan. 18, 2007 (2 pages).
JVC Station; Jan. 18, 2007 (2 pages).
JVC PC Card & Mobile; Jan. 18, 2007 (2 pages).
JVC Power Hub; Jan. 18, 2007 (1 page).
JVC T-Adapter; Jan. 18, 2007 (1 page).
J. Hofmann, Cable, Television, and the Consumer Electronic Bus, Symposium Record, 15th International TV Symposium, Jun. 11, 1987, Montreux, Switzerland (9 pages).
Lior Ophir; Yigal Bitran; "802.11 Over Coax—A Hybrid Coax—Wireless Home Network Using 802.11 Technology"; Texas Instruments, 2004, 6 pages.
*Cisco Systems, Inc.* v. *Mosaid Technology Inc.*, redacted, public version Complaint filed in the United States District Court for the District of Delaware, Aug. 16, 2010 (full version of the Complaint having been filed under seal and thus unavailable to the public).
Office Action dated Aug. 1, 2003: U.S. Appl. No. 09/552,564; 9 pages.
Office Action dated Jan. 28, 2004: U.S. Appl. No. 09/552,564; 9 pages.
Office Action dated Apr. 28, 2004: U.S. Appl. No. 09/552,564; 13 pages.
Office Action dated May 29, 2009: U.S. Appl. No. 11/121,075; 8 pages.
Office Action dated Dec. 23, 2008: U.S. Appl. No. 10/890,199; 11 pages.
Office Action dated Apr. 14, 2009: U.S. Appl. No. 10/890,199; 82 pages.
Office Action dated Dec. 24, 2008: U.S. Appl. No. 10/998,015; 12 pages.
Office Action dated Apr. 13, 2009: U.S. Appl. No. 10/998,015; 53 pages.
Office Action dated Dec. 29, 2008: U.S. Appl. No. 11/121,075; 10 pages.
Office Action dated Feb. 20, 2009: U.S. Appl. No. 11/128,229; 112 pages.
Office Action dated Dec. 30, 2008: U.S. Appl. No. 11/128,383; 11 pages.
Office Action dated Dec. 24, 2008: U.S. Appl. No. 11/605,336; 11 pages.
Yi-Fu Chen et al; "A 100-kbps Power-Line Modem for Household Applications"; International Symposium on Jun. 8-10, 1999, pp. 179-182.
Yi-Fu Chen et al; "Baseband Transceiver Design of a 128-kbps Power-Line Modem for Household Applications"; IEEE Transactions Issue: Apr. 2, 2002, vol. 17, pp. 338-344.
S. Dastangoo et al; "Wireless LAN Technologies and Applications"; MILCOM '93; Conference Record, IEEE, vol. 2, pp. 497-501.
J.C. Kelly; "Power Line Based LAN Applications in Residential Communication and Control"; Wireless LAN Implementation, 1992; IEEE Conference on Sep. 17-18, 1992, pp. 38-41.
J.M.W. Newbury; Potential Communication Services Using Power Line Carriers and Broadband Integrated Services Digital Network; , IEEE Transacations on Oct. 1999, vol. 14, pp. 1197-1201.
K. Pahlavan, et al; "Trends in Local Wireless Networks"; Communications Magazine, IEEE, Issue 3, Mar. 1995, vol. 33, pp. 88-95.
W.N. Sado et al; "Personal Communication on Residential Power Lines—Assessment of Channel Parameters"; Fourth IEEE International Conference on Nov. 6-10, 1995, pp. 532-537.
H. Zeino et al; Functional Approach to a Hybrid Wireless Network for Mobile Stations; Personal, Indoor and Mobile Radio Communications, 1994, 5$^{th}$ IEEE International Symposium on Sep. 18-23, 1994; vol. 3, pp. 994-998.
Gershon, E.; "FDDI on Copper with AMD PHY Components"; Advanced Micro Devices, Inc.; 1991, pp. 1-7.

Lavoisard, J.L. et al; "ISDN Customer Equipments"; Commutation and Transmission, No. 3, 1987, pp. 35-50.
Keller et al; "Performance Bottlenecks in Digital Movie Systems"; Proceedings of the 4$^{th}$ International Workshop on Network and Operating System Support for Digital Audio and Video, 1993, pp. 161-172.
Stallings, W.; "Local Networks—An Introduction" pp. ii, xii-xvi, 373-381, 1984.
Stallings, W.; "Local Networks—Second Edition" pp. I-v, viii-xiv, 427-434, 1987.
Stallings, W.; "Local Networks—Third Edition" pp. I-v, x-xvi, 499-510, 1990.
Strole, N.; "The IBM Token-Ring Network—A functional Overview"; ; IEEE Network Magazine, vol. 1, No. 1, 1987, pp. 23-30.
Willett, M.; "Token-ring Local Area Networks—An Introduction"; IEEE Network Magazine, vol. 1, No. 1, 1987, pp. 8 and 9.
"Integrated Services Digital Network (ISDN)", International Telecommunications Union, vol. III, Fascicle III.8, pp. 175-176 and 204-209, 1988.
An Interoperable Solution for FDDI Signaling Over Shielded Twisted Pair; Advanced Micro Devices, Inc.; May 1991, pp. 1-16.
SuperStack II Baseline Switch, 14-Port TP (3016460) User Guide; 3Com; 1996 pp. 1-8.
SuperStack II Entry Hub User Guide; 3Com; 1996 pp. 1-8.
SuperStack II Baseline Switch 610 User Guide; 3Com; 1999, pp. 1-48.
SuperStack II Baseline 10/100 Switch User Guide; 3Com; 1998, pp. 1-8.
Cisco Catalyst 5000 Switching System; http://web/19961220170336/www.cisco.com; pp. 1-4, 1996.
Cisco Catalyst 5000 Series Documentation; http://web.archive.org/web/19961220192608/www.cisco.com; pp. 1-11, 1996.
Cisco Catalyst 5000 Group Switching Ethernet Modules; http://web.archive.org/web/19961220192604/www.cisco.com; pp. 1-5, 1996.
Cisco Catalyst 5000: Industry's First Modular, Multilayer-Capable Switching System for the Wiring Closet; http://web.archive.org/web/19961220192714/www.cisco.com; pp. 1-22, 1996.
Cisco Catalyst 5000 ATM Dual PHY LAN Emulation Module; http://web.archive.org/web/19961220191454/www.cisco.com; pp. 1-4, 1996.
Cisco LAN Emulation; http://web.archive.org/web/19961220192930/www.cisco.com; pp. 1-16, 1996.
Cisco Fast Ethernet 100-Mbps Solutions; http://web.archive.org/web/19961220192938/www.cisco.com; pp. 1-10, 1996.
Cisco Catalyst 5000: Industry's First Modular, Multilayer-Capable Switching System for the Wiring Closet; Cisco Systems, 1996, pp. 1-22.
Network Based Exchange—The Complete Communications Solution, NBX Corporation, 1997; 16 pages.
The Mac Reborn; Macworld, vol. 13, Issue 9, Sep. 1996, pp. 1-10.
SuperStack II Desktop Switch; 3Com, 1996, 2 pages.
CiscoPro Ether Switch CPW2115; Cisco Systems; 1995, 4 pages.
Hart Field Communication Protocol—An introduction for users and manufacturers; Hart Communication Foundation, 1995, 12 pages.
3ComImpactIQ External ISDN Modem; 3COM, 1996, 4 pages.
The Macintosh Reborn, Macworld—The Essential Macintosh Resource; 1996, 16 pages.
Cisco 2610 Router Cabling and Setup—Quick Start Guide; Cisco Systems, 1998, 18 pages.
Network Based Exchange—The Complete Communication Solution; NBX Corporation, 1997, 16 pages.
-48-Volt DC Power Supply Connection Guide, For the SuperStack II Switch 3900; Mar. 2000, pp. 1-9.
Office Action from the Korean Patent Office dated Feb. 2, 2007 for application No. KR-10-2002-7014029.
Office Action from the Korean Patent Office dated Jul. 10, 2008 for application No. KR-10-2008-7006206.
Strassberg, Dan; "Home Automation Buses: Protocols Really Hit Home"; EDN Design Feature, Apr. 13, 1995 (9 pages).
Hachman, Mark; "Compaq to Ride the CEBus"; EBN Jan. 22, 1996 (1 page).
Hoffman, J.; "Cable, Television, and the Consumer Electronic Bus"; Panasonic Technologies. Inc., pp. 165-173.

Grayson Evans, The CEBUs Standard User's Guide, 1st edition, May 1996, 317 pages.
IS-60.04; Node Communications Protocol Part 6: Application Layer Specification; Revision Apr. 18, 1996 (129 pages).
Markwalter, Brain et al; "CEBus Router Testing"; IEEE Transactions on Consumer Electronics Nov. 1991, vol. 37 No. 4 (8 pages).
Claim Chart presented in request for reexamination of U.S. Patent No. 6,480,510 request filed Jun. 10, 2009.
Claim Chart presented in request for reexamination of U.S. Patent No. 5,841,360 request filed May 26, 2009.
SuperStack II PS Hub User Guide; 3com; Jul. 1997; 188 pages.
SuperStack II Desktop Switch User Guide; 3Com; Jun. 1997; 148 pages.
Universal Serial Bus Specification Revision 1.0: Jan. 1996; 268 pages.
ComImpact IQ External ISDN Modem User Guide; Jul. 1997; 158 pages.
IEEE Standard for a High Performance Serial Bus; IEEE Std. 1394-1995; 1996; 392 pages.
Donnan, et al; "Token Ring Access Method and Physical Layer Specifications"; ANSI/IEEE Standard for Local Area Networks; ANSI/IEEE 802.5; 80 pages, 1985.
Gibson et al; Fibre Data Distributed Interface (FDDI)—Token Ring Physical Layer Medium Dependent (PMD); American National Standard for Information Systems; ANSI X3.166-1990; 58 pages, 1990.
Gibson et al; Fiber Distributed Data Interface (FDDI)—Token Ring Physical Layer Protocol (PHY); American National Standard for Information Systems; ANSI X3.148-1988; 34 pages, 1988.
Lohse, et al; Fiber Distributed Data Interface (FDDI)—Token Ring Media Access Control (MAC); American National Standard for Information Systems; ANSI X3.139-1987; 62 pages; 1987.
Stallings, W., Local Networks, an Introduction, p. 1-97, 1984.
007414-007430 EIA-600.35 RF Physical Layer and Medium Specification; Revision: IS-60, Aug. 30, 1995 (17 pages).
007431-007460 EIA-600.37 Symbol Encoding Sublayer; Revision: May 12, 1995 Draft (30 pages).
007461-007524 EIA-600.38 Power Line / RF Symbol Encoding Sublayer; Revision May 12, 1995 Draft (64 pages).
007525-007650 EIA 600.81 Common Application Language (CAL) Specification; Revision SP3484 Rev Sep. 17, 1996 (126 pages).
007651-007667 EIA 600.82 CAL Context Description; Revision SP3485 Rev Feb. 2, 1996 (17 pages).
007668-007796 Draft IS-60.04 Node Communications Protocol Part 6: Application Layer Specification; Revision Apr. 18, 1996 Draft (129 pages).
007797-007850 EIA 600.42 Node Medium Access Control Sublayer; Revision IS-60 Feb. 22, 1996 (54 pages).
007851-007910 EIA 600.41 Description of the Data Link Layer; Revision IS-60 Jan. 31, 1996 (60 pages).
007911-007919 Home Automation Buses: Protocols Really Hit Home; EDN Apr. 13, 1995 (9 pages).
007920-007922 Powerhouse Wireless Remote Controls; date unknown (3 pages).
007923-007925 Powerhouse Wireless Wall Switches; date unknown (3 pages).
007926-007944 EIA-600.10 Introduction to the CEBus Standard; revision Feb. 5, 1995 Draft (19 pages).
007945 Compaq to Ride the CEBus; by Mark Nachman, EBN Jan. 22, 1996 (1 page).
008660-008667 CEBus Router Testing; IEEE Transactions on Consumer Electronics Nov. 1991, vol. 37 No. 4 (8 pages).
010714-010723 JVC VIPSLAN-10 Infrared Wireless LAN system; (10 pages).
010724 VIPSLAN-10 Streaks Off the Wire; LAN Times Dec. 18, 1995 (1 page).
010725-010735 VIPSLAN-10; (11 pages).
010799-010800 JVC Introducing VIPSLAN-10; (2 pages).
010801-010802 JVC Satellite; (2 pages).
010803-010804 JVC Node; (2 pages).
010805-010806 JVC Station; (2 pages).
010807-010808 JVC PC Card & Mobile; (2 pages).
010809 JVC Power Hub; (1 page).
010810 JVC T-Adapter; (1 page).
010811-010814 Optical wireless Systems and Networks; IEEE Communications Dec. 1998 vol. 36 No. 12 p. 70-71 (4 pages).
012090-012095 GSM Over Ethernet; IEE Review Mar. 2002 (6 pages).
012856-012863 High Cost of Wiring Sparks Wireless LAN Alternatives; Computer Technology Review vol. XIV No. 3, Mar. 1994 (8 pages).
012864-012872 Cable, Television, and the Consumer Electronic Bus; by J. Hofmann, date unknown (9 pages).
015124-015133 VISPLAN-10 Infrared Wireless LAN system; JVC May 1996 (10 pages).
015134 'JVC introduces Ethernet compatible wireless LAN system'; Business Wire Sep. 26, 1995 (1 page).
015135-015137 Ethernet Wireless LAN Systems; BYTE Feb. 1996 (3 pages).
015138 'JVC introduces first Ethernet compatible wireless LAN system'; Business Wire Nov. 8, 1995 (1 page).
Zeino, H.; Misson, M.; "Functional Approach to a Hybrid Wireless Network for Mobile Stations"; Personal, Indoor and Mobile Radio Communications, 1994. 5th IEEE International Symposium on Sep. 18-23, 1994; vol. 3, pp. 994-998.
Pahlavan, K.; Probert, T.H.; Chase, M.E.; "Trends in Local Wireless Networks"; Communications Magazine, IEEE, Issue: 3, Mar. 1995, vol. 33, pp. 88-95.
Dastangoo, S.; Eftekari, R.; Tran, H.;"Wireless LAN Technologies and Applications"; MILCOM '93. Conference record. IEEE vol. 2, pp. 497-501.
Lior Ophir; Yigal Bitran; "802.11 Over Coax—A Hybrid Coax—Wireless Home Network Using 802.11 Technology"; Texas Instruments, 6 pages.
U.S. ITC Complaint in the matter Certain Equipment for Communications Networks, Including Switches, Routers, Gateways, Bridges, Wireless Access Points, Cable Modems, IP Phones, and Products Containing Same, May 13, 2011.
Japanese Office Action in application No. 2001-576670, drafted May 11, 2011.
"Air Connect Access Point User Guide, Version 1.0", 1-90, Jan. 1, 2000.
Drudy, Francis, "Considerations and Recommendations on Power Feeding at an 802.9", IEEE 802.9—IVD LAN Interface Working Group, Reference IEEE 802.87*9.618, 1-6, Nov. 5, 1987.
Bell, Robert, "IEEE P802.9F Draft Standard for Local and Metropolitan Area Networks—Supplement to Integrated Services (IS) LAN Interface at the Medium Access Control (MAC) and Physical (PHY) Layers", 1-22, Nov. 7, 1996.
Bell, Robert, "IEEE Standards Project, P802.9F Draft Standard for Local and Metropolitan Area Netoworks—Supplement to Integrated Services (IS) LAN Interface at the Medium Access Control (MAC) and Physical (PHY) Layers", 1-34, Jul. 8, 1997.
"IEEE 802.9, IEEE Standards for Local and Metropolitan Area Networks: Integrated Services (IS) LAN Interface At the Medium Access Control (MAC) and Physical (PHY) Layers, IEEE Standard 802.9", 1-437, Sep. 22, 1994.
"IEEE 802.9A, IEEE Standards for Local and Metropolitan Area Networks: Supplement to Integrated Services (IS) LAN Interface at the Medium Access Control (MAC) and Physical (PHY) Layers: Specification of ISLAN16-T", 1-344, Oct. 16, 1995.
"Cisco Systems, Inc., Cisco Consumer Products LLC, Scientific-Atlanta LLD, and Cisco Systems International B.V.'S Response to Complaint of Mosaid Technologies Inc., Response to Complaint", Investigation No. 337-TA-778, 1-72, Jul. 21, 2011.
"ISE/IEC JTC 1/SC 25/WG 1, xTR 15045-1: Information Technology Architecture for Residential Gateways", 1-35, Dec. 30, 1999.
Media Access Control (MAC) Parameters, Physical Layer, Medium Attachment Units, and Repeater for 100 Mb/s Operation, Type 100BASE-T (Clauses 21-30); IEEE Standards for Local Metropolitan Area Networks: Supplement to Carrier Sense Multiple Access with Collision Detection (CSMA/CD) Access Method and Physical Layer Specifications; 1995, 200 pages, Jun. 14, 1995.

United States International Trade Commission, Order No. 21: Construing the Terms of the Asserted Claims of the Patents at Issue (Public Version); In the Matter of Certain Equipment for Communications Networks, Including Switches, Routers, Gateways, Bridges, Wireless Access Points, Cable Modems, IP Phones, and Products Containing Same; ITC Investigation No. 337-TA-778, 148 pages, Feb. 14, 2012.

3Com Nbx 2101PE Basic Phone Product Details; http://www.3com.com/products/enUS/printsafe.jsp?sku=3C10248PE&pathtype=support; Jan. 8, 2007, pp. 1-3.

Platt, Richard, "New Standard Helps Multimedia Get Off the Ground", IEEE Multimedia, vol. 3, Issue 2, Summer 1996, 78-82, Apr. 1996.

Ross, Floyd E. et al, "IsoEthernet: An Integrated Services LAN", IEEE Communications, vol. 34, Issue 8, Aug. 1996, 74, 79-84.

Negus, Kevin J. et al, "HomeRF and SWAP: Wireless Networking for the Connected Home", Mobile Computing and Communications Review, vol. 2, No. 4, Oct. 1998, 28-37.

Ramanathan, Srinivas et al, "A Home Network Controller for Providing Broadband Access to Residential Subscribers", IEEE Transactions on Consumer Electronics, vol. 41, No. 3, Aug. 1995, 859-868.

"2Wire's DSL Residential Gateway to Offer High-Speed Wireless In-Home Services Using Proxim's HomeRF Cordless Networking Products", 1-2, Jan. 6, 2000.

"Cayman Systems and Proxim Combining Wireless LAN with ADSL Modem/Gateway to Enable Low Cost, Broadband Internet Access for Multiple PC Homes", 1-2, May 10, 1999.

Krasne, Alexandra, "Xircom Announces Wireless Networking for Handspring", 1-2, Jan. 5, 2000.

"Elisa Communications and Nokia Bring Wireless High-Speed DSL Internet Access to Greater Helsinki, Finland", Nokia Networks, 1 page, Apr. 12, 2000.

"Nokia MW1112 and MW1122: Wireless Delivery of DSL-capacity Internet Connections Within the Home", Nokia Networks, 2 pages, May 9, 2000.

"Nokia Introduces a New ADSL Terminal Providing Wireless LAN Connectivity for Homes and Small Offices", 1 page, Sep. 21, 1999.

American National Standards Insititute, Inc., "Network and Customer Installation Interfaces—Asymmetric Digital Subscriber Line (ADSL) Metallic Interface", 1999, 1-264, Nov. 11, 1998.

"IEEE 802.3, Carrier Sense Multiple Access with Collision Detection (CSMA/CD) Access Method and Physical Layer Specifications", IEEE Standard for Information Technology—Telecommunications and Information Exchange Between Systems—Local and Metropolitan Area Networks—Specific Requirements—Part 3, 1985, 146 pages, Jun. 24, 1983.

"IEEE 802.3ab, Supplement to Carrier Sense Multiple Access with Collision Detection (CSMA/CD) Access Method and Physical Layer Specifications—Physical Layer Parameters and Specifications for 1000 Mb/s Operation Over 4-Pair of Category 5 Balanced Copper Cabling, Type 1000Base-T" Information Technology—Telecommunications and Information Exchange Between Systems—Local and Metropolitan Area Networks—Specific Requirements, 1999, 140 pages, Jun. 26, 1999.

"IEEE 802.11, Part II: Wireless LAN Medium Access Control (MAC) and Physical Layer (PHY) Specifications", Information Technology—Telecommunications and Information Exchange Between Systems—Local and Metropolitan Area Networks—Specific Requirements, 1997, 465 pages, Jun. 26, 1997.

"TIA/EIA TSB-110, Residential Gateway", Dec. 1999, 22 pages.

Waring, David L. et al, "A newly Emerging Customer Premises Paradigm for Delivery of Network-Based Services", Computer Networks, vol. 31, Num. 4, 411-424, Feb. 25, 1999.

Miki, Tetsuya, "Toward the Service-Rich Era", IEEE Communications Magazine, Feb. 1994, pp. 34-39.

Mochida, Yukou, "Technologies for Local-Access Fibering", IEEE Communications Magazine, Feb. 1994, 64-73.

Cook, Andy et al, "Optical Fiber Access—Perspectives Toward the 21st Century", IEEE Communications Magazine, Feb. 1994, 78-86.

"NETBuilder II Inteligent Routers", 3Com NETBuilder Datasheet, Jun. 1998, 1-8.

"Highly-Integrated ISA Ethernet Controller", Dec. 1995, 1-132.

International Telecommunication Union, "ISDN User-Network Interface Data Link Layer—General Aspects", CCITT, Q.920, Nov. 1988, 20 pages.

International Telecommunication Union, "ISDN User-Network Interface Data Link Layer Specification"CCITT, Q.921, Nov. 1988, 118 pages.

International Telecommunication Union, "ISDN User-Network Interfaces—Reference Configurations", 1.411, Mar. 1993, 11 pages.

International Telecommunication Union, "ISDN User-Network Interfaces—Basic User-Network Interface—Layer 1 Specification", 1.430, Mar. 1993, 106 pages.

International Telecommunication Union, "ISDN User-Network Interfaces—Primary Rate User-Network Interface—Layer 1 Specification", 1.431, Mar. 1993, 44 pages.

"IEEE 802.1D, IEEE International Standard: Information Technology-Telecommunications and Information Exchange Between Systems—Local Area Networks—Media Access Control (MAC) Bridges", 181 pages, Jul. 8, 1993.

"IEEE 802.9, IEEE Standards for Local and Metropolitan Area Networks: Integrated Services (IS) LAN Interface at the Medium Access Control (MAC) and Physical (PHY) Layers, IEEE Standard 802.9", 1994, 437 pages, Sept. 22, 1994.

"IEEE 802.9A, IEEE Standards for Local and Metropolitan Area Networks: Supplement to Integrated Services (IS) LAN Interface at the Medium Access Control (MAC) and Physical (PHY) Layers: Specification of ISLAN16-T", 344 pages, Feb. 16, 1996.

Droms, R., "Dynamic Host Configuration Protocol (DCHCP) Request for Comments 1531", Bucknell University, Oct. 1993, 1-40.

Wimer, W., "Clarifications and Extensions for the Bootstrap Protocol, Request for Comments 1542", Carnegie Mellon University, Oct. 1993, 1-23.

Shimizu, Hiroshi et al, "IVDLAN Standardization and Development", IEICE Transactions on Communications, vol. E74-B, No. 9, Sep. 1991, 2696-2702.

Amada, Eiichi et al, "An Integrated PABX/LAN System Architecture", Communications, 1988, ICC '88, Digital Technology—Spanning the Universerse, Conference Record, IEEE International Conference, vol. 3., Jun. 1988, 1533-1538.

"HiGain Remote Unit, Engineering Services Technical Practice Section 150-412-181-01, Revision 01", 42 pages, Mar. 31, 1998.

"ASCEND Pipeline 25 ISDN Remote Lan Access, Bandwidth on Demand, Getting Started Guide", 111 pages, Aug. 18, 1995.

"AT and T Practice, SLC 24 and 96 Carrier Systems, Channel Unit Installation, Loop Transmission Systems", Select Code 363-202-402, Issue 2, Jul. 1985, 335 pages.

"AT and T Practice, SLC 96 Carrier System, Maintenance Pair Gain System", Select Code 363-202-500, Issue 1, Aug. 1983, 497 pages.

"AT and T Practice, SLC 96 Subscriber Loop Carrier System, Remote Terminal Pair Gain Systems", Select Code 363-202-401, Issue 1, Feb. 1982, 506 pages.

Cervenka, Dana, "Building Cablephone Systems Piece by Piece", CED: Communications Engineering and Design, 6 pages, Mar. 1, 1996.

"Quick Installation and Reference for the Model RPSU Redundant Power Supply Unit", Bay Networks, Sep. 1995, 1-15.

Platt, Richard, "Why IsoEthernet Will Change the Voice and Video Worlds", IEEE Communications Magazine, vol. 34, Issue 4, Apr. 1996, 55-59.

Fausti, A. et al, "Remote Powered Data Transmission System, Telecommunications Energy Conference", INTELEC '89, Conference Proceedings, Eleventh International, vol. 2, Oct. 1989, 1-5.

"IEEE 802.11a, Part II: Wireless LAN Medium Access Control (MAC) and Physical Layer (PHY) Specifications: High Speed Physical Layer in the 5 GHz Band", Supplement to IEEE Standard for Information Technology—Telecommunications and Information Exchange Between Systems—Local and Metropolitan Area Networks—Specific Requirements, Sep. 1999, pp. 1-91.

Zakowski, Wayne A., "IEEE 802.9 Draft Standard Integrated Services (IS) LAN Interface at the MAC and PHY Layers (IEEE Unapproved Draft)", 1-502, Nov. 8, 1992.

"IEEE P802.9af, Draft Standard for Local and Metropolitan Area Networks—Supplement to Integrated Services (IS) LAN Interface at the Medium Access Control (MAC) and Physical (PHY) Layers", 1997, 1-34.

"ISO/IEC JTC 1/SC 25/WG 1, xTR 15045-1: Information Technology Architecture for Residential Gateways", 1-35, Dec. 30, 1999.

"ISO/IEC JTC 1/SC 25/WG 1, Information Technology—Interconnection of Information Technology Equipment—Architecture for HomeGate, the Residential Gateway (AHRG)", CD1 15045-01, 1-40, Apr. 1, 2000.

"ISO/IEC JTC1 SC25 WG1, HomeGate: A Residential Gateway Model for HES", 1-8, May 25, 1998.

"ISO/IEC JTC1/SC25 WG1, HomeGate: A Residential Gateway Model for HES", 1-7, Feb. 16, 1998.

"ISO/IEC JTC1/SC25/WG1, HomeGate: Current Issues on Broadband Interworking and the Residential Gateway", 1-13, Jun. 16, 1997.

"ISO/IEC JTC 1/SC 25/WG 1, HomeGate: A Residential Gateway Model for HES, rev. 5", 1-14, Oct. 14, 1998.

"ITU-T G.992.1, Series G: Transmission Systems and Media, Digital Systems and Networks: Digital Transmission Systems—Digital Sections and Digital Line System—Access Networks: Assymmetric Digital Subscriber Line (ADSL) Transceivers", Jun. 1999, pp. 1-256.

"ITU-T G.992.2, Series G: Transmission Systems and Media, Digital Systems and Networks: Digital Transmission Systems—Digital Sections and Digital Line System—Access Networks: Splitterless Asymmetric Digital Subscriber Line (ADSL) Transceivers", Jun. 1999, pp. 1-179.

"Product Description: Nokia MW1112: ADSL over ISDN/WLAN Terminal", Version 1.20/10.4.3.2000/PC, JTO, Nokia Networks, 2000, 1-17.

Aragon, Martin et al, "Residential Gateway Viability", published as early as 1998, pp. 1-15.

North America's Home and Building Automation Association, "The Residential Gateway Report and TIA/EIA Residential Gateway", CABA: IS-98-5, Dec. 1998, 1-70.

Caswell, Wayne, "Intersection Gateways, Connect NC and E-commerce Services to Homes and Small Businesses", TR41.5 meeting in Portland, OR, 1-50, May 17, 1999.

"IEEE 802.11b, Part II: Wireless LAN Medium Access Control (MAC) and Physical Layer (PHY) Specifications: Higher-speed Physical Layer Extension in the 2.4 GHz Band", Supplement to IEEE Standard for Information Technology—Telecommunications and Information Exchange Between Systems—Local and Metropolitan Area Networks—Specific Requirements, Sep. 1999, pp. 1-96.

Cisco Systems, Inc., Respondents' Notice of Prior Art (Redacted); in the Matter of Certain Equipment for Communications Networks, Including Switches, Routers, Gateways, Bridges, Wireless Access Pointes, Cable Modems, IP Phones and Products Containing Same; ITC Investigation No. 337-TA-778, 86 pages, Aug. 12, 2011.

Horowitz, Paul et al., Art of Electronics, Second Edition, Cambridge University Press, 1989, pp. 44, 45, 47, 48, 316-319.

Bell, Robert, IEEE P802.9F Draft Standard for Local and Metropolitan Area Networks—Supplement to Integrated Services (IS) LAN Interface At the Medium Access Control (MAC) and Physical (PHY) Layers, Nov. 1996, pp. 1-22.

Introduction to the IrDA Protocol, Sep. 1997, pp. 1-22.

The LAN Catalogue; Black Box Corporation; published Winter of 1989, 6 pages.

Media Access Control (MAC) Parameters, Physical Layer, Medium Attachment Units, and Repeater for 100 Mb/s Operation, Type 100BASE-T (Clauses 21-30); IEEE Standards for Local Metropolitan Area Networks: Supplement to Carrier Sense Multiple Access with Collision Detection (CSMA/CD) Access Method and Physical Layer Specifications; 1995, 200 pages.

Cervenka, Dana, Cablephone Not Ringing Yet; CED: Communications Engineering and Design, Mar. 1995, pp. 32, 33, 34, 36, 38, 40 and 42.

Horowitz, Paul et al, "Art of Electronics", Second Edition, Cambridge University Press, 1989, pp. 1-205, (Part 1).

Horowitz, Paul et al, "Art of Electronics", Second Edition, Cambridge University Press, 1989, pp. 206-354, (Part 2).

Horowitz, Paul et al, "Art of Electronics", Second Edition, Cambridge University Press, 1989, pp. 355-437, (Part 3).

Horowitz, Paul et al, "Art of Electronics", Second Edition, Cambridge University Press, 1989, pp. 438-738, (Part 4).

Horowitz, Paul et al, "Art of Electronics", Second Edition, Cambridge University Press, 1989, pp. 739-924, (Part 5).

Horowitz, Paul et al, "Art of Electronics", Second Edition, Cambridge University Press, 1989, pp. 925-1125, (Part 6).

FIGURE 1 (PRIOR-ART)

FIGURE 2 (PRIOR-ART)

FIGURE 3 (PRIOR-ART)

FIGURE 4 (PRIOR-ART)

NETWORK COMBINING WIRED AND NON-WIRED SEGMENTS

CROSS-REFERENCE TO RELATED APPLICATIONS

This application is a division of U.S. application Ser. No. 11/605,336, filed on Nov. 29, 2006, now allowed, which is a continuation of Ser. No. 10/998,015, filed on Nov. 29, 2004; which is a continuation of U.S. application Ser. No. 10/890,199, filed on Jul. 14, 2004; which is a continuation of U.S. application Ser. No. 09/552,564, filed on Apr. 19, 2000, now U.S. Pat. No. 6,842,459, issued: Jan. 11, 2005, the disclosures of all of which are incorporated herein by reference

FIELD OF THE INVENTION

The present invention relates to the field of communication networks, and, more specifically, to the networking of devices within a building via combined wired and non-wired communication.

BACKGROUND OF THE INVENTION

There is a growing need for networking within the home. This need is driven by two major factors, the increasing use of multiple data devices and the emergence of broadband services in the home.

Lately there has been an expansion in the number of homes in the USA with multiple personal computers. In addition, connectivity and networking capabilities have been added to appliances, such as refrigerators and microwave ovens. Furthermore, there is a trend toward enabling data connectivity among various multimedia (audio and video) appliances such as TV's, VCR's, receivers, and speakers. The term "data unit" as used herein denotes any device capable of generating and/or receiving data. The networking of data units enables the sharing of files and applications as well as the sharing of common peripheral devices, along with other benefits.

Another driving force behind the need for home connectivity products is the growth in the number of on-line households. As high-speed connections to information and broadband entertainment sources soar, there is a growing need to share and distribute this access among appliances within the house. These broadband services are supplied mainly by three types of service providers:
1. Telco's, via xDSL connections (currently ADSL, to be followed by VDSL).
2. CATV. Currently via Cable-Modem, to be followed by digital Set-Top-Box.
3. Wireless connections, such as Satellite, LMDS, WLL, and others.

Communication within a home can be classified into two types: wired and non-wired. These are covered below:

Wired Communication

Wired communication requires using at least two distinct electrical conductors. The wiring can be new wiring installed and dedicated for data communication within the home, such as installing structured wiring such as Category 5 type, used in Ethernet IEEE802 networks. However, the installation of a new wiring structure within a home is labor-intensive, complex, and expensive. Alternatively, existing home wiring, which was previously installed for a specific purpose, can be used for data communication without substantially affecting or degrading the original service. Existing wiring includes telephone wiring, power line wiring, and cable TV wiring. These are reviewed below.

For all wired configurations, the present invention relies upon electrically-conducting lines which may be pre-existing within a building, which have at least two distinct electrical conductors, and which are capable of transporting data communication signals. Furthermore, the present invention relies upon suitable outlets, to which the electrically-conducting lines are coupled, and which are capable of connecting to external devices.

Telephone Wiring

In-home telephone service usually employs two or four wires, and is accessed via telephone outlets into which the telephone sets are connected.

FIG. 1 shows the wiring configuration of a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, which establishes and enables telephony from one telephone to another. The term "analog telephony" as used herein denotes traditional analog low-frequency audio voice signals typically under 3 KHz, sometimes referred to as "POTS" ("Plain Old Telephone Service"), whereas the term "telephony" in general denotes any kind of telephone service, including digital service such as Integrated Services Digital Network (ISDN). The term "high-frequency" as used herein denotes any frequency substantially above such analog telephony audio frequencies, such as that used for data. ISDN typically uses frequencies not exceeding 100 KHz (typically the energy is concentrated around 40 Khz). The term "telephone line" as used herein denotes electrically-conducting lines which are intended primarily for the carrying and distribution of analog telephony, and includes, but is not limited to, such electrically-conducting lines which may be pre-existing within a building and which may currently provide analog telephony service. The term "telephone device" as used herein denotes, without limitation, any apparatus for telephony (including both analog telephony and ISDN), as well as any device using telephony signals, such as fax, voice-modem, and so forth. Junction box 16 is used to separate the in-home circuitry from the PSTN and is used as a test facility for troubleshooting as well as for wiring new in the home. A plurality of telephones 13a and 13b connects to telephone lines 5 via a plurality of telephone outlets 11a, 11b, 11c, and 11d. Each outlet has a connector (often referred to as a "jack"), denoted in FIG. 1 as 12a, 12b, 12c, and 12d, respectively. In North-America, RJ-11 is commonly used. Each outlet may be connected to a telephone unit via a connector (often referred to as a "plug"), denoted in FIG. 1 (for the two telephone units 13a and 13b illustrated) as 14a and 14b, respectively. It is also important to note that lines 5a, 5b, 5c, 5d, and 5e are electrically the same paired conductors.

While network 10 exhibits serial or daisy-chained topology wherein the wiring is serialized from an outlet the next one only, other topologies such as star, tree or any arbitrary topology may also exist. However, the telephone wiring system within a residence is always composed of wired media: two or four copper wires, and several outlets which provides direct access for connecting to these wires.

There is a requirement for simultaneously using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form LAN over two-wire telephone lines, but without the telephone service.

As an another example, relevant prior-art in this field is disclosed in U.S. Pat. No. 5,896,443 to Dichter (hereinafter referred to as "Dichter"). Dichter suggests a method and apparatus for applying frequency domain/division multiplexing (FDM) technique for residential telephone wiring, enabling simultaneously carrying telephone and data communication signals. The bandwidth enabled by the wiring is split into a low-frequency band capable of carrying an analog telephony signal and a high-frequency band capable of carrying data communication signals. In such mechanism, the telephone service is not affected, while data communication capability is provided over existing telephone wiring within a home. The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described, for example, in U.S. Pat. No. 4,785,448 to Reichert et al. (hereinafter referred to as "Reichert"). Also widely used are xDSL systems, primarily Asymmetric Digital Subscriber Loop (ADSL) systems. The Dichter network is illustrated in FIG. 2, which shows a network 20 serving both telephones and providing a local area network of data units. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers (the term "transceiver" herein denotes a combined transmitter and receiver). DCE units 23a, 23b, and 23c are respectively connected to high pass filters (HPF) 22a, 22b, and 22c. The HPF's allow the DCE units access to the high-frequency band carried by telephone-line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, in a second embodiment (shown in FIG. 2) low pass filters (LPF's) 21a, 21b, and 21c are added to telephones 13a, 13b, and 13c from telephone line 5. Furthermore, a low pass filter is also connected to Junction Box 16, in order to filter noises induced from or to the PSTN wiring 17. It is important to note that lines 5a, 5b, 5c, 5d, and 5e are electrically the same paired conductors.

Additional prior-art patents in this field can be found under US Class 379/093.08, which relates to carrying data over telephone wiring without any modifications made to the telephone wiring (e.g. wires and outlets). U.S. Pat. No. 5,841,360 and U.S. patent application Ser. Nos. 09/123,486 and 09/357,379 to the present inventor are the first to suggest modifying the telephone wiring, by means of splitting the wiring into distinct segments, each of which connects two telephone outlets. In this way, the network is modified from 'bus' topology into multiple 'point-to-point' segments, enabling superior communication characteristics.

Part of such a network 30 is shown in FIG. 3, describing outlets 31a and 31b, substituting outlets 11 of FIGS. 1 and 2. The telephone wiring 5 is split into distinct segments 5a, 5b and 5c. Low-Pass Filter (LPF) and High-Pass Filters (HPF) are coupled to each wire segment end, in order to split between the telephony and the data signals. As shown in FIG. 3, LPF's 21b and 21c are attached to each end of wiring segment 5b. The LPF's are designed to allow passing of the telephony signals, and are connected together thus offering a continuous path for the telephony signals. Access to the tele phony signals is made via connectors 12a and 12b in the outlets, into which telephone devices 13a and 13b are connected via connectors 14a and 14b respectively. Thus, the telephony service is fully retained. The data signals, carried in the high part of the spectrum, are accessed via HPF's 26a and 22b, coupled to each end of the telephone wire segment 5b. HPF's 22a and 26b are connected to the ends of the wire segments 5a and 5c respectively. Each HPF is connected to a modem 23 and 27, which transmit and receive data signals over the telephone wiring. Modems 23a, 27a, 23b, and 27b are connected to HPF's 22a, 26a, 22b and 26b respectively. Data units 24a and 24b are connected to the outlets 31a and 31b respectively, via a connector (not shown in the Figure) in the outlet. The data units are coupled via DTE interface in the outlet. Outlets 31a and 31b comprise DTE interfaces 29a and 29b respectively. The three data streams in each outlet, two from each modem and one from the DTE, are handled by an adapter 28a and an adapter 28b, which serve outlets 31a and 31b, respectively. While FIG. 3 describes an embodiment wherein all the components for the relevant functions are housed within the outlet, other embodiments are also possible, wherein only some of the components for these functions are contained within the outlet.

Power Lines

It is possible to transmit data over wiring used for distribution of electrical power within the home, which is normally at a frequency of 50 or 60 Hz. Access to the power is available via power outlets distributed around the house. Such wiring consists of two wires (phase and neutral) or three wires (phase, neutral, and ground).

FDM techniques, as well as others, are used for enabling data communication over power lines. Many prior-art patents in this field can be found in US Class 340/310.

Cable Television Lines

It is also possible to transmit data over wiring used for the distribution of television signals within the home. Such wiring usually is coaxial cable.

Both power line and cable television wiring systems resemble the telephone line structure described in FIG. 1. The wiring system is based on conductors, usually located in the walls, and access to these wires is obtained via dedicated outlets, each housing a connector connected directly to the wires. Common to all these systems, is the fact that the wiring was installed for a dedicated purpose (telephone, power, or cable TV signal distribution). Wherever one of these existing wiring systems is used for carrying data, it is desirable that the original service (telephony, power, or television signal distribution) be unaffected. Dedicated modems are used for carrying data over the media concurrently with the original service.

When using existing wiring, specific wired modems are normally required for communicating over the electrically-conducting lines, and access to the electrically-conducting lines is provided via the relevant outlets. Using electrically-conducting lines as the communication media allows for high bandwidth, and provides robust and cost-effective communication. In addition, communication over large distances is possible, which in most cases enables coverage of the whole house, thereby guaranteeing communication from any outlet to another within the house.

Such networks, however, require data units to be connected to the outlets, usually by means of a cable from the data unit to a suitable nearby outlet. This makes the connection complex and hard-to-use, requires the data unit to be in proximity to an appropriate outlet, and impairs mobility for some data units within the house.

Non-Wired Communication

Non-wired solutions for in-home data networking use waves propagated without an electrically-conducting medium. Three main techniques are commonly used:

1. Radio Frequency (RF). Transmission of data between data units can be accomplished with radio frequency electromagnetic signals. As an example, IEEE802.11 can be used.
2. Light. Transmission of data between data units can be accomplished with light in the visible or non-visible spectrum. Currently, the most popular is infrared (IR) based communication. Most such systems require 'line-of-sight' placement of the communicating data units.
3. Sound. Transmission of data between data units can be accomplished with sound waves, either in the audio spectrum (20-20,000 Hz), or inaudible spectrum (ultrasonic, above 20,000 Hz; or infrasonic, below 20 Hz).

It is noted that although light and radio waves are both electromagnetic phenomena, they occupy different parts of the electromagnetic spectrum and have significantly different characteristics for purposes of the present invention. Thus, light and radio waves are herein treated as distinct physical phenomena.

An example of a non-wired data network 40 is shown in FIG. 4. Two data units 41a and 41b are shown, into which non-wired transceivers 42a and 42b are respectively coupled. The non-wired transceivers 42a and 42b communicate over a space 43 without any electrically-conducting medium. If RF transmission is used, the transceivers are RF transceivers, and the communication over space 43 is based on the propagation of radio frequency electromagnetic waves. Similarly, in the case of light-based communication, transceivers 42a and 42b utilize light emitters (e.g. LEDs) and light detectors (e.g. photoelectric cell), and the communication over space 43 relies on the propagation of light. Likewise, in the case of sound-based communication over space 43, the transceivers use microphones and speakers, and the communication relies on the propagation of sound waves through the air in the space 43. Since these solutions do not require any physical connection such as cable, they provide both ease-of-use and mobility. However, such non-wired solutions are effective over short distances only. Furthermore, most of the non-wired solutions cannot easily pass through walls and other such obstructions, owing to the attenuation to the signals. Hence, such techniques are suitable for communication within a single room, but are not suitable for communication between the rooms of a home or other building.

There is thus a widely recognized need for, and it would be highly advantageous to have, a means for implementing a data networking in-home between data units, wherein such data units can be networked within a home or other building, while providing mobility and ease of use. This goal is met by the present invention.

SUMMARY OF THE INVENTION

The present invention discloses a data communication network within a building having wired and non-wired segments. The wired segments are based on electrically-conducting lines installed within the building. In addition to supporting data communication, these electrically-conducting lines concurrently distribute a primary service other than the transport of data communication signals, such as telephone service, electrical power service, or cable television service, and may be pre-existing wires originally-installed to distribute the primary service. Dedicated outlets are used to enable direct access to the wiring. The present invention uses means for utilizing the electrically-conducting lines concurrently for both the transport of data communication signals and the primary service, without any interference between these two uses. The non-wired segments employ communication without electrically-conducting media, via waves propagated through open space, such as by light or radio waves, or by acoustic waves in air.

The wired and non-wired segments are combined by means of circuitry in one or more outlets. The coupling device is a module containing one port for coupling to the wired network using a specific wired modem. Another port of the device couples to the non-wired segment, using a non-wired modem. An adapter handles the data flow between the wired segment and the non-wired segment, and has provision for protocol conversion, if required.

The module coupling both segments, or any of the components of the module, can be fully integrated into the outlet, partially integrated into the outlet, or externally coupled to it. Therefore, according to the present invention there is provided a local area network within a building for transporting data among a plurality of data units, the local area network including at least one wired segment and at least one non-wired segment, wherein the at least one wired segment includes: (a) at least one electrically-conducting line within the building, the electrically-conducting line having at least two conductors and operative to transport data communication signals; (b) at least two outlets, each operative for coupling to the electrically-conducting line; and (c) at least one wired modem coupled to the electrically-conducting line, operative to communicate over the electrically-conducting line; (d) and wherein the at least one non-wired segment is operative to communicating data without electrically-conducting media and includes at least one non-wired modem, wherein at least one of the outlets couples a wired segment to a non-wired segment, and wherein the at least one electrically-conducting line is furthermore operative for concurrently distributing a service other than the transport of data communication signals.

BRIEF DESCRIPTION OF THE DRAWINGS

The invention is herein described, by way of example only, with reference to the accompanying drawings, wherein.

DETAILED DESCRIPTION OF THE INVENTION

Figure 1:
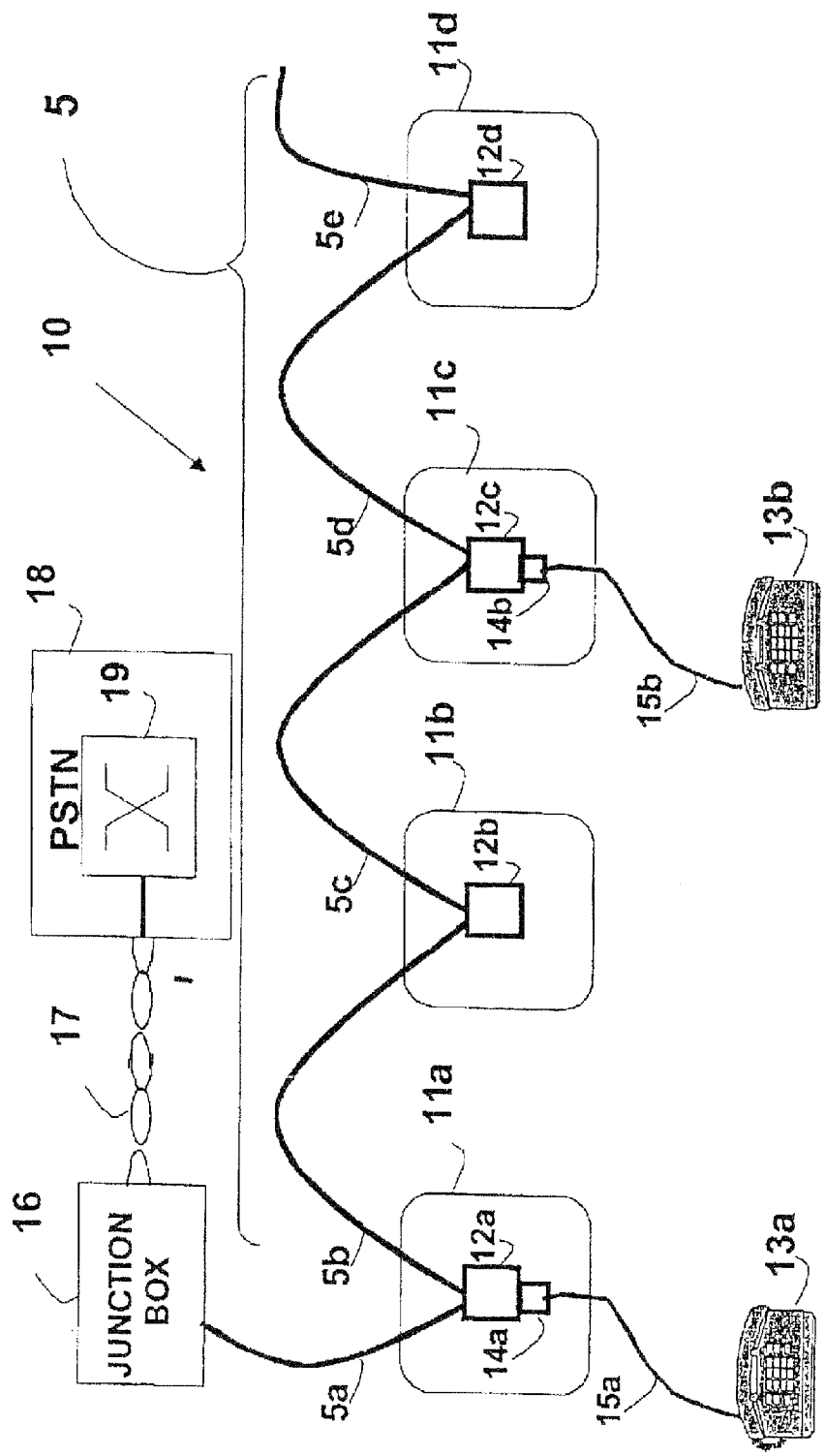
FIG. 1 shows a common prior art telephone line-wiring configuration for a residence or other building.
Figure 2:
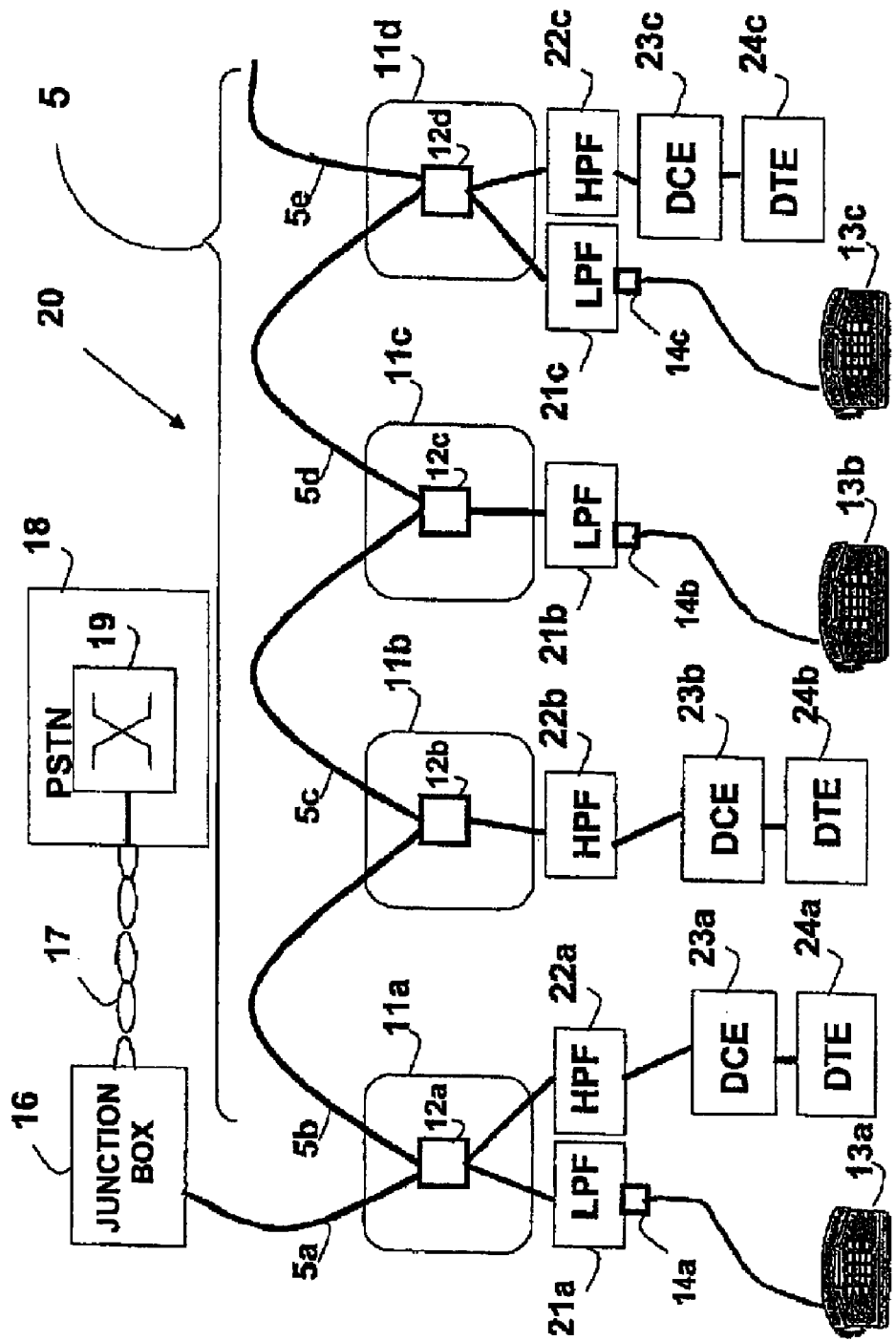
FIG. 2 shows a first prior art local area network based on telephone line wiring for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components that are common to different embodiments or configurations.

Figure 5:
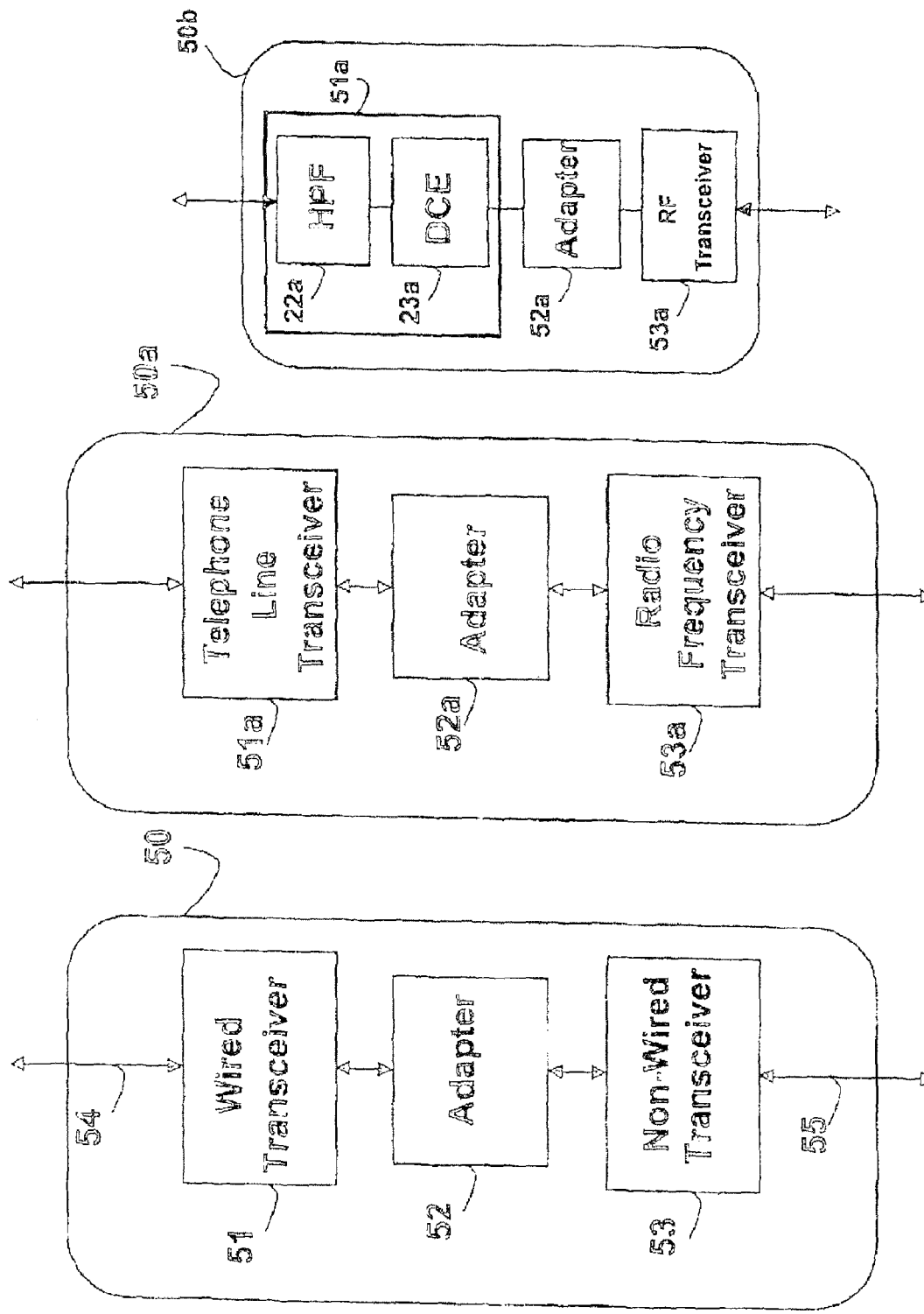
FIG. 5 shows modules according to the present invention.

The invention is based on a wired/non-wired network adapter module (hereinafter referred to as "module"). A functional description of such a module 50 is shown in FIG. 5. The module comprises a physical port 54 for connecting to the wired network. The communication with the wired network is carried by wired transceiver 51. Wired transceiver port 54 and transceiver 51 are dependent upon the type of wired network. Interfacing a telephone line-based network requires a telephone line transceiver, while connecting to a power line network requires a power line dedicated modem. Additionally, the connection to the wired network may require specific means in order to meet regulatory and safety requirements, as well as specific means for ensuring that the basic service (e.g. telephony service, power distribution) is not substantially degraded or affected.

The non-wired segment interfaces via a port 55. Port 55 communicates without an electrically conducting medium. Communication with this non-wired segment is handled by a non-wired modem/transceiver 53. The term "non-wired modem" herein denotes any device capable of data communication without requiring an electrically conducting medium. The data to and from the wired segment and the data to and from the non-wired segment are handled by a protocol adapter 52. Protocol adapter 52 may serve as a transparent unit, acting as a repeater/regenerator, dealing with the physical layer only of the OSI model. However, higher layers can also be handled by the protocol adapter 52. In such a case, the protocol adapter will function as a bridge, router, gateway or any other adaptation mechanism as required.

Other facilities of module 50 may contain logic, control, processing, storage, power-supply and other components not shown in FIG. 5. The communication supported by module 50 can be simplex (unidirectional, either from the wired towards the non-wired segment or vice-versa), half-duplex, or full duplex. A module 50a connects a telephone line network segment to an RF network segment. Module 50a employs a telephone line modem 51a as the wired network interface, a radio-frequency modem 53a as an interface to the non-wired network segment, and a protocol adapter 52a. A module 50b is an embodiment of the present invention, in which the telephone line transceiver can be implemented by a high-pass filter (HPF) 22a and data terminal equipment (DCE) 23a, as also used by Dichter as discussed previously.

Figure 6:
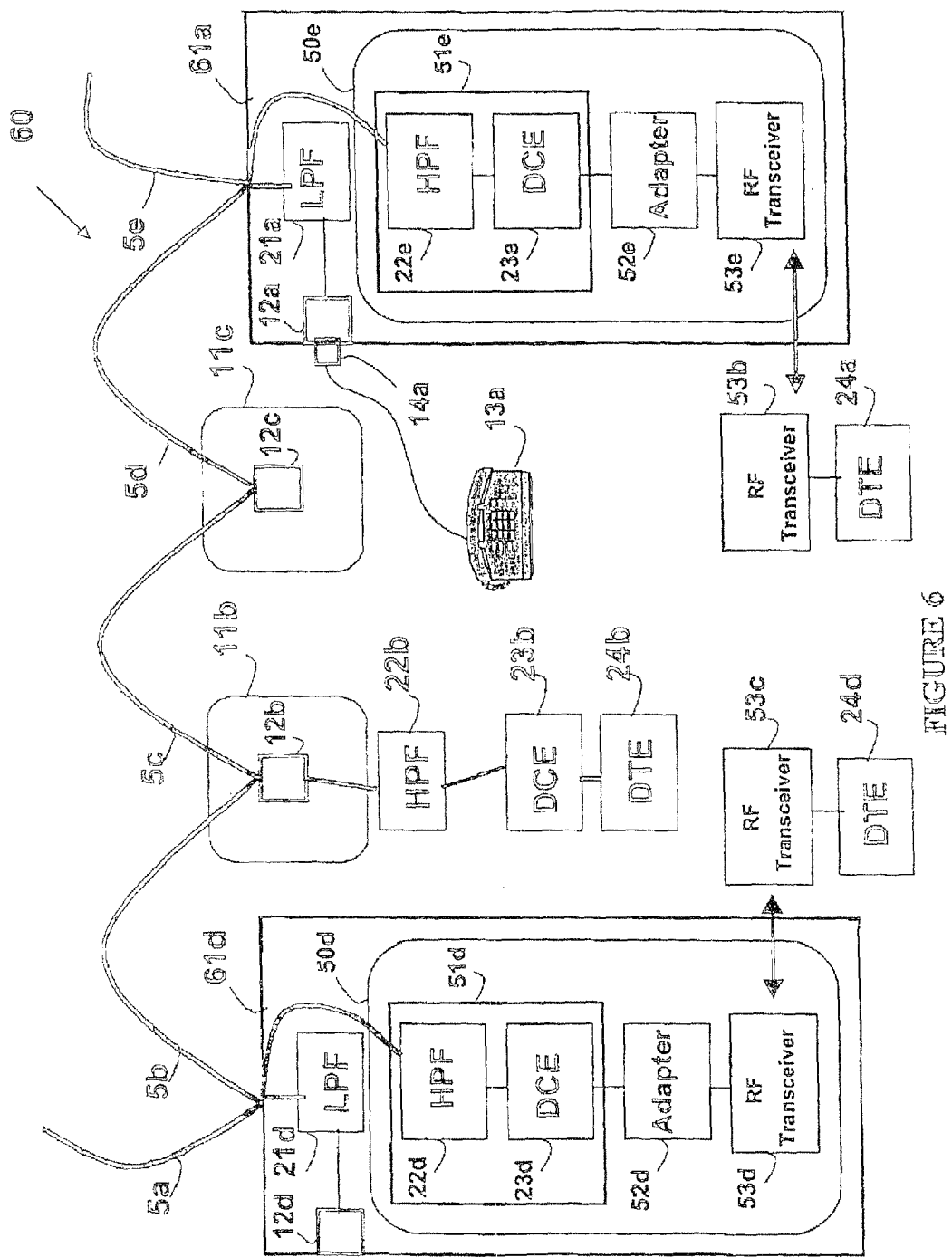
FIG. 6 shows a local area network according to the present invention, wherein telephone wiring used for the wired segment and radio-frequency communication for the non-wired segment.

FIG. 6 shows an embodiment of a network 60 according to the present invention that includes wired and non-wired segments. The wired segment is based on telephone wiring 5 within a building as described in FIG. 1. While outlets 11b and 11c are unchanged, outlets 11a and 11d are replaced by outlets 61d and 61a, respectively, containing modules 50d and 50e respectively. Basic telephone service is retained by employing low-pass filters (LPF) 21d and 21a in outlets 61d and 61a respectively. The LPF's are coupled to telephone connectors 12d and 12a respectively, enabling connection of telephone devices. This is illustrated by a telephone 13a connected by connector 14a to connector 12a in outlet 61a. A Dichter-type data communication network is established by connecting data terminal equipment (DTE) via a modem and HPF, as illustrated by DTE 24b connected to DCE 23b, which is coupled to HPF 22b, which is in turn directly coupled to telephone wiring 5 via connector 12b in outlet 11b.

The non-wired part of network 60 is based on radio frequency transmission, utilizing a pair of RF transceivers 53 (FIG. 5). As shown in FIG. 6, DTE's 24d and 24a are coupled to RF transceivers 53c and 53b, respectively. In turn, each such RF transceiver communicates with RF transceivers 53d and 53a, respectively, which are integrated within outlets 61d and 61a, respectively.

Integrating the wired and non-wired segments of the network is accomplished by modules 50d and 50e, each of which is illustrated by module 50c in FIG. 5. Modules 50d and 50e are integrated within outlets 61d and 61a, respectively. Each such module interfaces the wired segment of the network by a telephone modem. Each such modem contains a high-pass filter 22 and DCE 23, as described previously for a Dichter-type network. Interfacing to the non-wired segment of network 60 is performed via an RF transceiver, wherein modules 50d and 50e comprises RF transceivers 53d and 53e respectively. Protocols and data conversion between both segments are performed by adapter 52 (FIG. 5), wherein adapters 52d and 52e are integrated within modules 50d and 50e respectively.

Network 60 allows DTE's 24d, 24b and 24a to communicate among themselves. While DTE 24b is connected to the network via a wired connection, DTE's 24d and 24a can communicate in a non-wired manner. While FIG. 6 illustrates a single DTE connected by wires and two DTE's connected without wires, it is obvious that any number of DTEs of each type can be connected. Furthermore, while in network 60 each outlet supports a single wired or non-wired DTE connection, other implementations can also be supported. For example, an outlet can provide one or more wired connections simultaneously with one or more non-wired connections.

While FIG. 6 illustrates the case where module 50 is integrated in an outlet 61, embodiments of the present invention also include those wherein the module is external to the outlet. Similarly, selective parts of a module may be integrated within an outlet while other parts are external. In all cases, of course, appropriate electrical and mechanical connection between the module and the outlet are required. A network outlet is physically similar in size, shape, and overall appearance to a standard outlet, so that a network outlet can be substituted for a standard outlet in the building wall. No changes are required in the overall telephone line layout or configuration.

Network 60 provides clear advantages over hitherto proposed networks. For example, DTEs (e.g. PC's) located in different rooms can interconnect without the need to use any wires. A radio-frequency transceiver in each DTE communicates with the nearest outlet, and the outlets communicate between rooms over the telephone wiring media.

Figure 3:
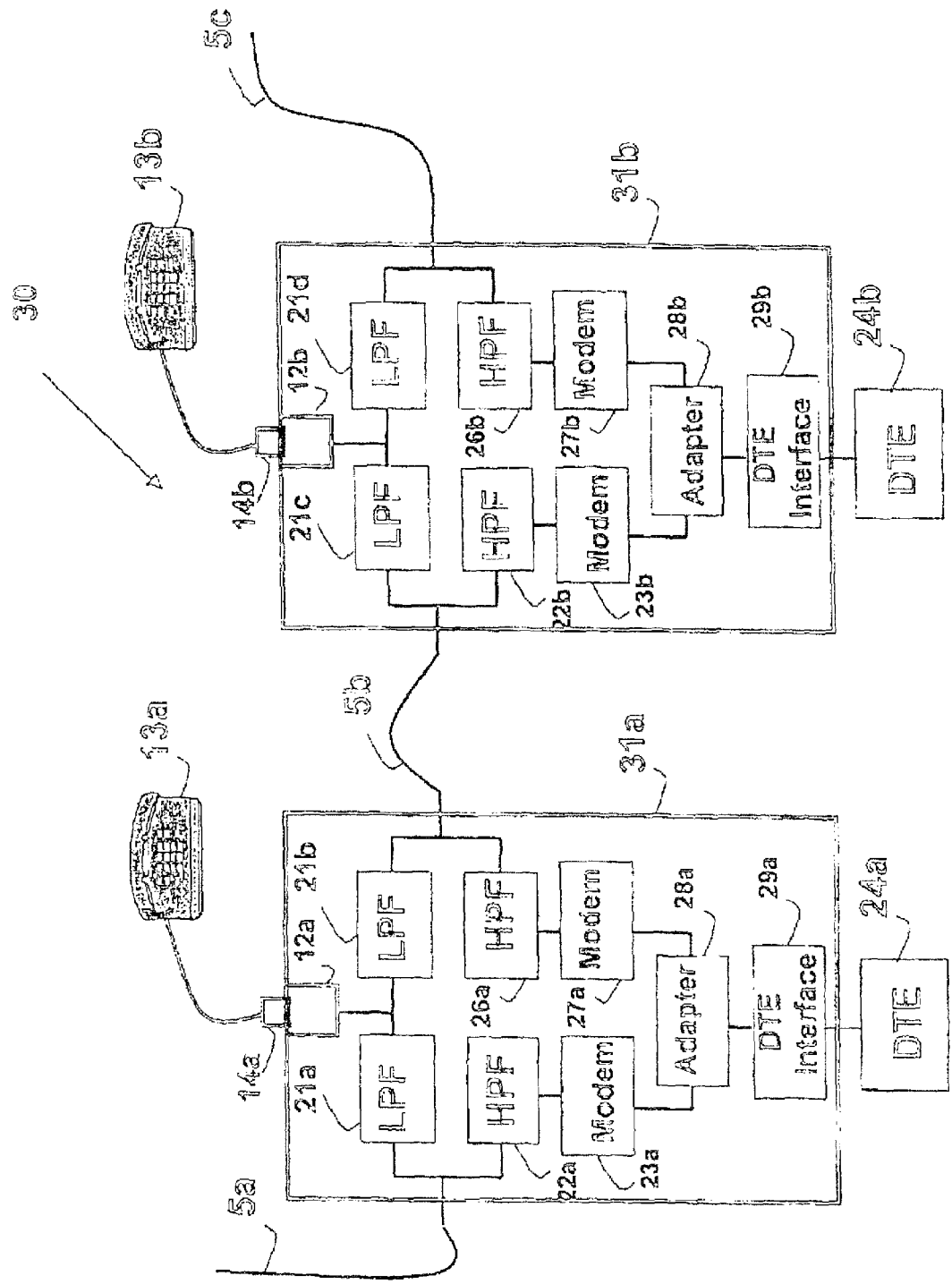
FIG. 3 shows a second prior art local area network based on telephone line wiring for a residence or other building.
Figure 4:
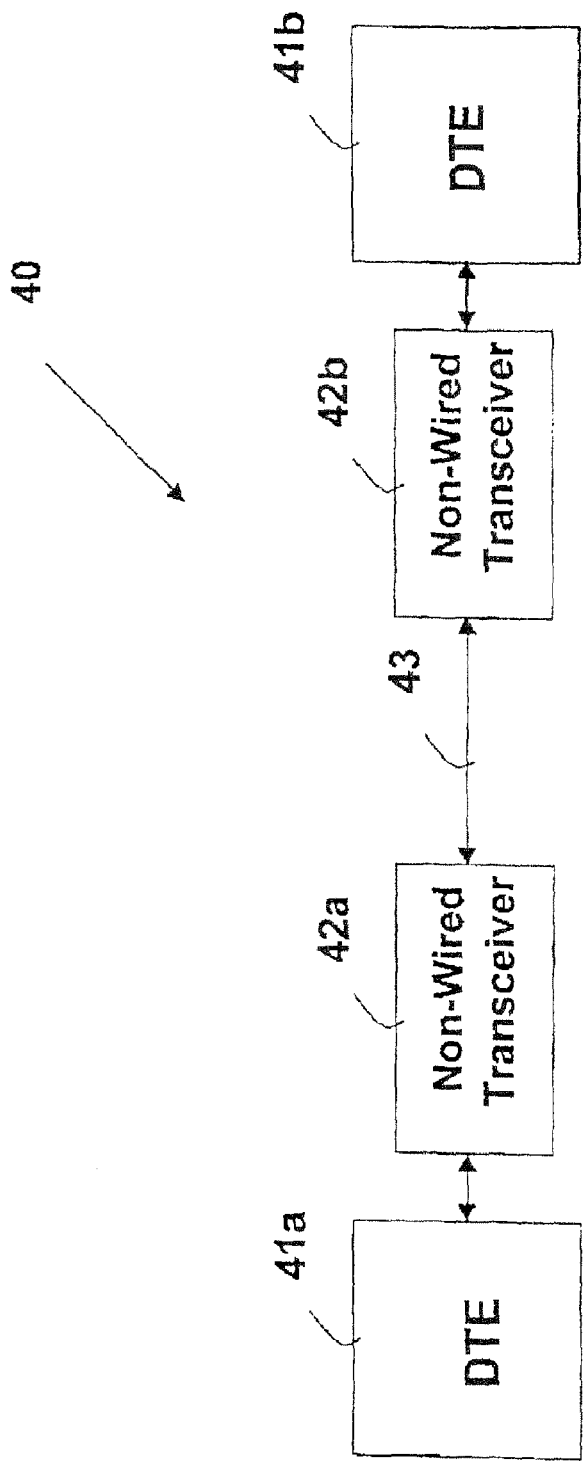
FIG. 4 shows a prior art non-wired communication network.
Figure 7:
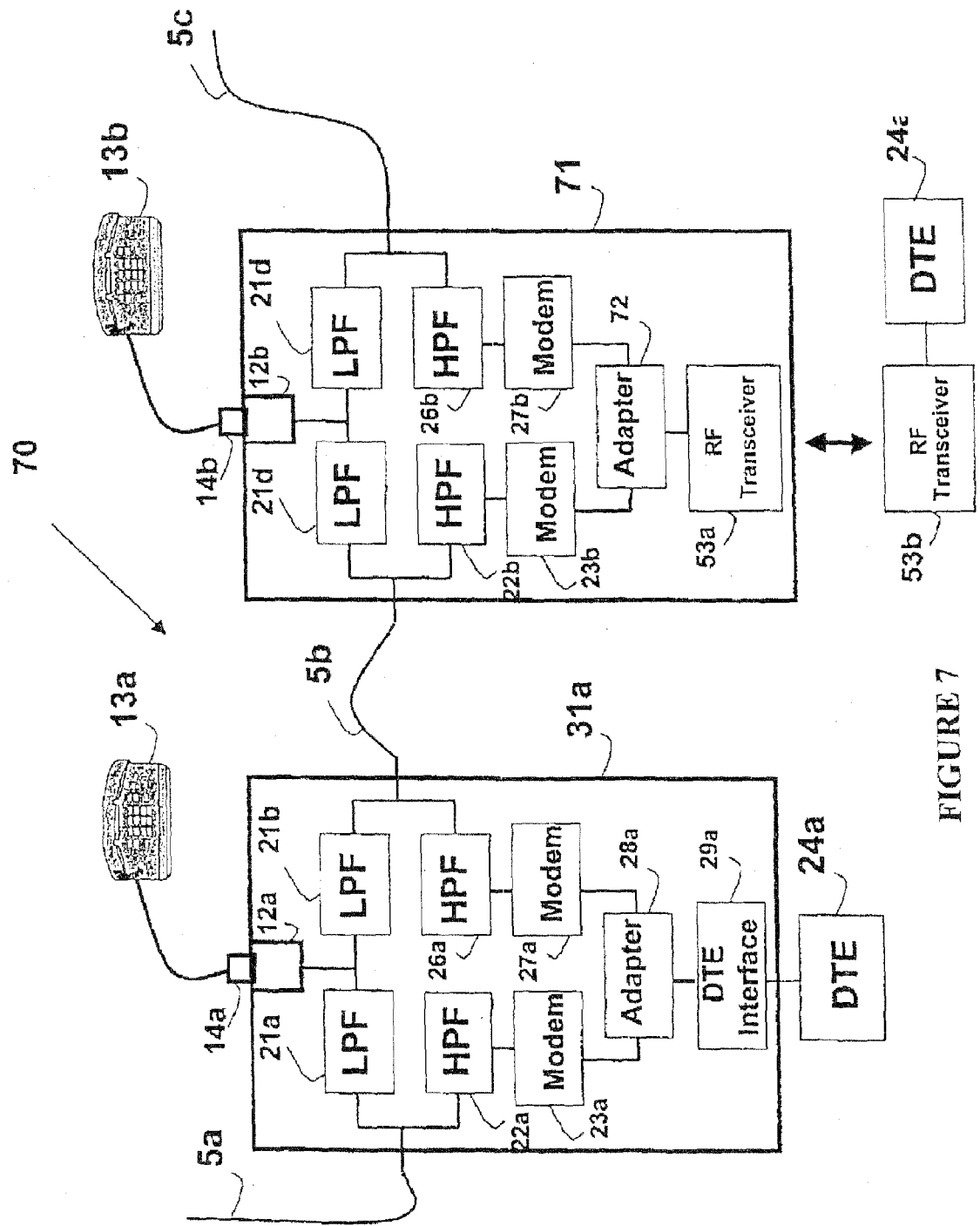
FIG. 7 shows a second embodiment of a local area network based on telephone lines as the wired segment and radio frequency communication for the non-wired segment.

The invention can equally well be applied to the prior art wired network illustrated in FIG. 3. FIG. 7 shows part of a network 70. Outlet 31a represents a prior-art network outlet. In order to interface to the non-wired network segments, an outlet 71 according to the present invention must be used. With the exception of RF transceiver 53a within outlet 71, which communicates with RF transceiver 53b connected to a DTE 24a, outlet 71 is similar to outlet 31a. In this embodiment, the module includes two telephone line modems 23b and 27b, a three-port adapter 72 (for the two wired ports and the single non-wired port), and RF transceiver 53a. The advantages offered by the prior-art topology apply also for this configuration.

While the present invention has been described above for the case where the wired media is based on a telephone line system and includes telephone wires and telephone outlets, the present invention can equally well be applied to other wired systems such as those based on power and cable television signal distribution. In the case of an electrical power distribution system, the electrical wires and outlets employed for power distribution in the house are used. Similarly, cable television wiring and outlets can also be used. In all cases, it may be necessary to retain the basic service for which the wiring systems were installed: telephony service, electrical power distribution, or television signals. This is usually achieved by adding the appropriate circuitry to separate the data communication network from the basic service, as well as to avoid interference of any kind between the two roles currently employing the same wiring. For example, the LPF's 21a, 21b, 21c, and 21d; and HPF's 22a, 22b, 26a, and 26b (FIG. 7) serve the role of separating the telephony service from the data communication network and vice-versa.

While the present invention has been described above for the case wherein the non-wired communication is accomplished by radio-frequency transmission, the present invention can be equally applied to other types of non-wired communication, such as:

1. Non-wired communication accomplished by other forms of electromagnetic transmission. Electromagnetic waves in various parts of the electromagnetic spectrum can be used for communication. For example, low-frequency electromagnetic radiation can be used to transmit audio-frequency signals over short distances without a carrier. Radio-frequency transmission is a special case of this general electromagnetic transmission. As noted previously, light is also a special case of electromagnetic radiation, but is herein treated separately because of the characteristics of light are distinctly different from those of electromagnetic transmission in other usable parts of the electromagnetic spectrum.
2. Non-wired communication accomplished by light. Either visible or non-visible light wavelength can be used for such transmission. As previously noted, currently, the most popular is infrared (IR) based communication. Most such systems require substantially 'line-of-sight' access.
3. Non-wired communication accomplished by sound. Either audible sound (20-20,000 Hz band), or inaudible sound (ultrasonic, above 20,000 Hz; or infrasonic, below 20 Hz).

In addition to the described data communication function, the network according to the present invention can also be used for control (e.g. home automation), sensing, audio, or video applications, and the communication can also utilize analog signals (herein denoted by the term "analog communication"). For example, a video signal can be transmitted in analog form via the network.

Upgrade Kit

Figure 8:
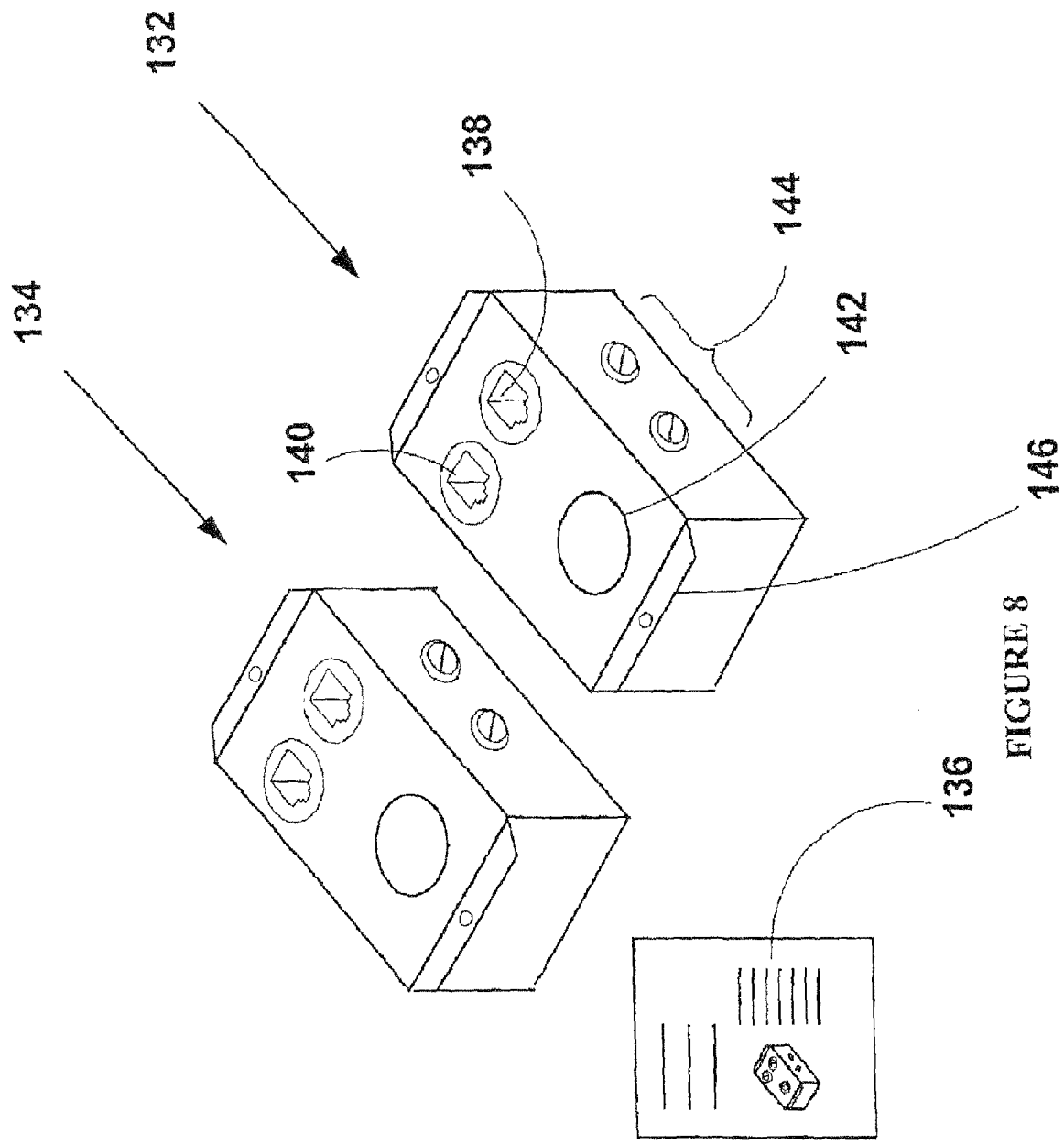
FIG. 8 shows a kit for upgrading existing electrically-conducting lines to support a network according to the present invention.

The present invention also contemplates a kit for upgrading existing electrically conducting lines to support a network as described above. FIG. 8 illustrates an embodiment of such a kit containing an outlet 132 and an outlet 134 and installation instructions 136. Outlet 132 has connection 144 for coupling to a wired segment and mounting points such as a flange 146 for installing in the building walls. Outlet 132 also has a jack 138 and a jack 140 for connecting to external devices via cables, and a transducer 142 for connecting to external data units via a non-wired segment. Within outlet 132 is a module according to the present invention, as previously described and illustrated in FIG. 5. In one embodiment, transducer 142 is a radio frequency transceiver. In another embodiment, transducer 142 is a combined light-emitting diode and photocell receiver. In still another embodiment, transducer 142 is a combined speaker and microphone. Likewise, in one embodiment, jack 138 is a telephone jack. In another embodiment, jack 138 is an electrical power socket. In still another embodiment, jack 138 is a cable television jack. In one embodiment, jack 140 is a data jack. The embodiment of the kit illustrated in FIG. 8 has two outlets, outlet 132 and outlet 134, which are illustrated as substantially identical. However, in another embodiment, the kit contains only outlet 132. In still another embodiment, outlet 134 does not contain a transducer. Other variations are also possible in different embodiments.

It will also be appreciated that the outlet and the adapter module may be provided as separate components for use in upgrading existing wiring of a building to support a local area network having at least one wired segment and at least one non-wired segment. They may likewise find independent use for further expanding a hybrid network that has previously been upgraded according to the invention. Such an outlet is provided with a first coupler for coupling the outlet to the at least one non-wired segment, and a second coupler for coupling the outlet to the existing wiring via an adapter module. The adapter module may be either fully or partially integrated within the outlet.

A method for upgrading existing electrically conducting lines within a building to support a network according to the present invention involves:

(a) providing a wired modem;
(b) providing a non-wired modem;
(c) providing an adapter for handling the data communications between a wired segment and a non-wired segment; and
(d) providing an outlet, and
(e) equipping the outlet with the wired modem, the non-wired modem, and the adapter.

While the invention has been described with respect to a limited number of embodiments, it will be appreciated that many variations, modifications and other applications of the invention may be made.

What is claimed is:

1. A network for non-wired communication between first and second non-wired data units respectively located at first and second locations and communicating with each other over existing wiring in a building to concurrently carry a bi-directional packet-based wired digital data signal and a power signal, said network comprising:

a first device housed in a first single enclosure, said first device being connected at the first location to transmit and receive digital data over the wiring, said first device being a non-wired device communicatively couplable to exchange packet-based digital data over a non-wired medium with the first non-wired data unit, said first device further being operative to transmit to the wiring data received from the first non-wired data unit and to transmit to the first non-wired data unit digital data received from the wiring; and a second device housed in a second single enclosure, said second device being connected at the second location to transmit and receive digital data over the wiring, said second device being a non-wired device communicatively couplable to exchange packet-based digital data over a non-wired medium with the second non-wired data unit, said second device further being operative to transmit to the wiring data received from second non-wired data unit and to transmit to the second non-wired data unit digital data received from the wiring;

wherein said network is operative to transparently and bi-directionally pass digital data between the first and second non-wired data units, and wherein said first device is at least in part powered from the power signal carried over the wiring.

2. The network according to claim 1 wherein the wiring is at least in part in walls of a building and is connected to a first wall-mounted outlet at the first location and to a second wall-mounted outlet at the second location, and wherein said first and second devices are in the building and are respectively connected to the first and second outlets via first and second standard connectors.

3. The network according to claim 2 wherein at least one of said first and second devices is mechanically attached to the respective outlet.

4. The network according to claim 2 wherein at least one of said first and second devices is mechanically detachable from the respective outlet.

5. The network according to claim 2 wherein at least one of said first and second devices is mountable into an outlet cavity or opening.

6. The network according to claim 1 wherein the same non-wired protocol is used for the exchange of packet-based data over a non-wired medium between said first device, and the first non-wired data unit and between said second device and the second non-wired data unit.

7. The network according to claim 6 wherein the digital data signal carried over the wiring uses a wired protocol distinct from the non-wired protocol, and wherein each of said devices comprises a packet-based digital protocol adapter comprising one of: a bridge; a router; and a gateway, coupled to convert between the non-wired and wired protocols.

8. The network according to claim 1 wherein the exchange of data over one of the non-wired mediums with at least one of the first and second non-wired data units is based on one of: sound; visible light; infrared light; and radio frequency radiation.

9. The network according to claim 1 wherein the exchange of data over one of the non-wired mediums with at least one of the first and second non-wired data units uses radio frequency radiation based on the IEEE802.11 standard.

10. The network according to claim 1 wherein at least one of the first and second non-wired data units is located outside a building and the exchange of data over one of the non-wired mediums with at least one of the first and second non-wired data units is performed by an outdoor broadband service using radio frequency radiation.

11. The network according to claim 10, wherein the outdoor broadband service is based on one of: satellite, LMDS and WLL service.

12. The network according to claim 1, wherein at least one of said single enclosures is constructed to have at least one of the following:
a form substantially similar to that of a standard outlet;
wall mounting elements substantially similar to those of a standard wall outlet;
a shape allowing direct mounting in an outlet opening or cavity; and
a form to at least in part substitute for a standard outlet.

13. The network according to claim 1, wherein said first and second devices are identical to each other.

14. The network according to claim 1, wherein the first and second locations are respectively first and second rooms in the same building.

15. A device for use in a network for non-wired communication between first and second non-wired data units respectively located at first and second locations and connected together via existing wiring to concurrently carry a bi-directional packet-based wired digital data signal and a power signal, wherein:
said device is housed in a single enclosure and is connected at the first location to transmit and receive digital data over the wiring, said device being a non-wired device communicatively couplable to exchange packet-based digital data over a non-wired medium with the first non-wired data unit, said device further being operative to transmit to the wiring data received from the first non-wired data unit and to transmit to the first non-wired data unit digital data received from the wiring;
the network is operative to transparently and bi-directionally pass digital data between the first and second non-wired data units when another device, identical to said device, is connected at the second location to transmit and receive digital data in a digital data frequency band over the wiring.

16. A kit comprising first and second devices connectable together via existing wiring in a building to form a network for non-wired communication between first and second non-wired data units respectively located at first and second locations and communicating with each other over to concurrently carry a bi-directional packet-based wired digital data signal and a power signal, the network being operative to transparently and bi-directionally pass digital data between the first and second non-wired data units, wherein:
said first device is housed in a first single enclosure and is connectable to be at least in part powered from the power signal carried over the wiring, and said first device is connectable at the first location to transmit and receive digital data over the wiring, said first device being a non-wired device communicatively couplable to exchange packet-based digital data over a non-wired medium with the first non-wired data unit, said first device further being operative to transmit to the wiring data received from the first non-wired data unit and to transmit to the first non-wired data unit digital data received from the wiring; and
said second device is housed in a second single enclosure and is connectable at the second location to transmit and receive digital data over the wiring, said second device being a non-wired device communicatively couplable to exchange packet-based digital data over a non-wired medium with the second non-wired data unit, said second device further being operative to transmit to the wiring data received from second non-wired data unit and to transmit to the second non-wired data unit digital data received from the wiring.

17. A network for non-wired communication between first and second non-wired data units respectively located at first and second locations and connected together via an existing telephone wire pair to concurrently carry a bi-directional packet-based wired digital data signal and an analog telephone signal using frequency division multiplexing, wherein the wired digital data signal is carried in a digital data frequency band and the analog telephone signal is carried in an analog telephone frequency band distinct from and lower than the digital data frequency band, said network comprising:
a first device housed in a first single enclosure, said first device being connected at the first location to transmit and receive digital data in the digital data frequency band over the telephone wire pair, said first device being a non-wired device communicatively couplable to exchange packet-based digital data over a non-wired medium with the first non-wired data unit, said first device further being operative to transmit to the telephone wire pair data received from the first non-wired data unit and to transmit to the first non-wired data unit digital data received from the telephone wire pair; and a second device housed in a second single enclosure, said second device being connected at the second location to transmit and receive digital data in the digital data frequency band over the telephone wire pair, said second device being a non-wired device communicatively couplable to exchange packet-based digital data over a non-wired medium with the second non-wired data unit, said second device further being operative to transmit to the telephone wire pair data received from second non-wired data unit and to transmit to the second non-wired data unit digital data received from the telephone wire pair;

wherein said network is operative to transparently and bi-directionally pass digital data between the first and second non-wired data units.

18. The network according to claim 17 wherein the telephone wire pair is at least in part in walls of a building and is connected to a first wall-mounted telephone outlet at the first location and to a second wall-mounted telephone outlet at the second location, and wherein said first and second devices are in the building and are respectively connected to the first and second telephone outlets via first and second standard telephone connectors.

19. The network according to claim 18 wherein at least one of said first and second devices is mechanically attached to the respective telephone outlet.

20. The network according to claim 18 wherein at least one of said first and second devices is mechanically detachable from the respective telephone outlet.

21. The network according to claim 18 wherein at least one of said first and second devices is mountable into a telephone outlet cavity or opening.

22. The network according to claim 17 wherein the same non-wired protocol is used for the exchange of packet-based data over a non-wired medium between said first device and the first non-wired data unit and between said second device and the second non-wired data unit.

23. The network according to claim 22 wherein the digital data carried over said telephone wire pair uses a wired protocol distinct from the non-wired protocol, and wherein each of said devices comprises a packet-based digital protocol adapter consisting of one of: a bridge; a router; and a gateway, coupled to convert between the non-wired and wired protocols.

24. The network according to claim 17 wherein the exchange of data over a non-wired medium with at least one of the first and second non-wired data units is based on one of: sound; visible light; infrared light; and radio frequency radiation.

25. The network according to claim 17 wherein the exchange of data over a non-wired medium with at least one of the first and second non-wired data units uses radio frequency radiation based on IEEE802.11 standard.

26. The network according to claim 17 wherein the exchange of data over a non-wired medium with at least one of the first and second non-wired data units uses radio frequency radiation, at least one of the first and second non-wired data units is located outside a building, and the exchange of data over a non-wired medium with at least one of the first and second non-wired data units is performed by an outdoor broadband service.

27. The network according to claim 26, wherein the outdoor broadband service is based on one of: satellite, LMDS and WLL service.

28. The network according to claim 17, wherein at least one of said single enclosures is constructed to have at least one of the following:

a form substantially similar to that of a standard outlet;
wall mounting elements substantially similar to those of a standard wall outlet;
a shape allowing direct mounting in an outlet opening or cavity; and
a form to substitute for a standard outlet.

29. The network according to claim 17, wherein said first and second devices are identical to each other.

30. A kit comprising at least said first and second devices, the devices constitute the network of claim 17 upon connection to a telephone wire pair.

31. The network according to claim 17, wherein the first and second locations are respectively first and second rooms in the same building.

32. A device for use in a network for non-wired communication between first and second non-wired data units respectively located at first and second locations and connected together via an existing telephone wire pair to concurrently carry a bi-directional packet-based wired digital data signal and an analog telephone signal using frequency division multiplexing, wherein the wired digital data signal is carried in a digital data frequency band and the analog telephone signal is carried in an analog telephone frequency band distinct from and lower than the digital data frequency band, wherein:

said device is housed in a single enclosure and is connected at the first location to transmit and receive digital data in the digital data frequency band over the telephone wire pair, said device being a non-wired device communicatively couplable to exchange packet-based digital data over a non-wired medium with the first non-wired data unit, said device further being operative to transmit to the telephone wire pair data received from the first non-wired data unit and to transmit to the one of the first non-wired data unit digital data received from the telephone wire pair; and the network is operative to transparently and bi-directionally pass digital data between the first and second non-wired data units when a another, identical, device is connected at the second location to transmit and receive digital data in the digital data frequency band over the telephone wire pair.

* * * * *